(12) United States Patent
Graves

(10) Patent No.: US 10,644,603 B2
(45) Date of Patent: May 5, 2020

(54) ENERGY-HARVESTING POWER SUPPLIES

(71) Applicant: L3 Cincinnati Electronics Corporation, Mason, OH (US)

(72) Inventor: Justin Graves, Middletown, OH (US)

(73) Assignee: L3 CINCINNATI ELECTRONICS CORPORATION, Mason, OH (US)

( * ) Notice: Subject to any disclaimer, the term of this patent is extended or adjusted under 35 U.S.C. 154(b) by 0 days.

(21) Appl. No.: 16/195,992

(22) Filed: Nov. 20, 2018

(65) Prior Publication Data
US 2019/0296649 A1   Sep. 26, 2019

Related U.S. Application Data

(60) Provisional application No. 62/648,047, filed on Mar. 26, 2018.

(51) Int. Cl.
*H02M 3/335*   (2006.01)
*H02M 1/08*    (2006.01)
(Continued)

(52) U.S. Cl.
CPC ......... *H02M 3/33523* (2013.01); *H02M 1/08* (2013.01); *H02M 1/34* (2013.01);
(Continued)

(58) Field of Classification Search
CPC ........... H02M 2001/008; H02M 3/285; H02M 3/33523
(Continued)

(56) References Cited

U.S. PATENT DOCUMENTS 4,980,811 A * 12/1990 Suzuji ............... H02M 3/33561
                                                       323/250
6,005,782 A * 12/1999 Jain ......................... H02M 1/34
                                                       323/235
(Continued)

OTHER PUBLICATIONS

Ahola, J et al.; "Design Considerations for Current Transformer Based Energy Harvesting for Electronics Attached to Electric Motor", International Symposium on Power Electronics, Electrical Drives, Automation and Motion, 2008.
(Continued)

*Primary Examiner* — Gary A Nash
(74) *Attorney, Agent, or Firm* — Dinsmore & Shohl LLP

(57) ABSTRACT

Embodiments described herein are directed to an energy-harvesting circuit configured to harvest energy from a power converter circuit within a switch mode power supply and generate a positive, a negative or a bipolar power supply rail to power load circuitry. The energy-harvesting circuit includes a transformer, a coupling capacitor, a diode and a capacitor. The transformer has a primary winding, a secondary winding and a magnetic core shared therebetween. The primary winding is electrically connected between a drain and a source of a transistor switch connected to the power converter circuit. The coupling capacitor is electrically connected between the drain and the primary winding and configured to provide a reset mechanism for the magnetic core. The anode of the diode is electrically connected to the secondary winding. The capacitor is electrically connected in series with the cathode of the diode and in parallel with the load circuitry.

20 Claims, 17 Drawing Sheets

(51) Int. Cl.
   *H02M 1/34* (2007.01)
   *H02M 1/00* (2006.01)
   *H02M 3/28* (2006.01)
(52) U.S. Cl.
   CPC ........ *H02M 3/33553* (2013.01); *H02M 3/285* (2013.01); *H02M 2001/008* (2013.01); *H02M 2001/348* (2013.01)
(58) Field of Classification Search
   USPC .. 363/21.04, 21.07, 21.12, 21.15, 21.18, 22, 363/23
   See application file for complete search history.

(56) References Cited

U.S. PATENT DOCUMENTS

| | | | |
|---|---|---|---|
| 7,005,855 | B2 | 2/2006 | Zhu et al. |
| 7,137,385 | B2 | 11/2006 | Newton |
| 8,547,711 | B2 | 10/2013 | Reddy |
| 8,953,349 | B2 | 2/2015 | Divan et al. |
| 9,287,789 | B2 | 3/2016 | Cornell |
| 2007/0159143 | A1 | 7/2007 | Yang |
| 2010/0165671 | A1 | 7/2010 | Coulson et al. |
| 2012/0020121 | A1* | 1/2012 | Iino ............... H02M 3/1588 363/21.04 |
| 2013/0322129 | A1* | 12/2013 | Yonezawa ........ H02M 1/4258 363/20 |
| 2017/0085183 | A1 | 3/2017 | Notsch |

OTHER PUBLICATIONS

Al-Atrash, Tian; "Tri-Modal Half-Bridge Converter Topology for Three-Point Interface", Power Electronics Specialists Conference, 2007.

Yuan, B et al.; "A High Efficiency Current Fed Multi-Resonant Converter for High Step-Up Power Conversion in Renewable Energy Harvesting", Energy Conversion Congress and Exposition (ECCE), 2010.

Yuan, B. et al.; "Analysis and Design of a High Efficiency Current Fed Multi-Resonant Converter for High Step-Up Power Conversion in Renewable Energy Harvesting", 2nd IEEE International Symposium on Power Electronics for Distributed Generation Systems (PEDG), 2010.

\* cited by examiner

ENERGY-HARVESTING POWER SUPPLIES

CROSS-REFERENCE TO RELATED APPLICATIONS

This application claims priority to U.S. Provisional Patent Application No. 62/648,047 entitled "Energy Harvesting Power Supply" and filed on Mar. 26, 2018, which is hereby incorporated by reference in its entirety.

TECHNICAL FIELD

Embodiments of the present disclosure are directed to power supply circuits. More specifically, the embodiments described herein are directed to an energy-harvesting circuit placed in a switch mode power supply.

BACKGROUND

Many switch mode power supply waveforms show large voltage spikes caused by interrupting current through the leakage inductance of the main transformer. These spikes occur across the primary power supply switch and the output rectifier when they turn off and also across the main transformer's primary and secondary windings. Controlling voltage stress is one of the main problems in power supply design. Voltage stress may be addressed by: (a) maximizing efficiency by allowing voltage stress and the electromagnetic interference (EMI) it generates; (b) dissipating voltage stress as heat in passive snubbers and clamps; (c) using an "active clamp" to limit voltage stress with transistors and lumped element circuits; or (d) using a "clamp winding" to limit voltage stress with a dedicated winding in the main transformer. These techniques either dissipate voltage stress as heat or return leakage inductance energy back into the power supply each power switching cycle.

SUMMARY

Embodiments described herein are directed to power supply circuits and specifically to an energy-harvesting circuit placed in a switch mode power supply. In one embodiment, an energy-harvesting circuit is configured to harvest energy from a power converter circuit within a switch mode power supply and generate a positive, a negative or a bipolar power supply rail to power load circuitry. The energy-harvesting circuit includes a transformer, a coupling capacitor, a diode and a capacitor. The transformer has a primary winding, a secondary winding and a magnetic core shared therebetween, wherein the primary winding is electrically connected between a drain and a source of a transistor switch connected to the power converter circuit. The coupling capacitor is electrically connected between the drain and the primary winding and configured to provide a reset mechanism for the magnetic core in the transformer. The diode has an anode and a cathode, wherein the anode is electrically connected to the secondary winding. The capacitor is electrically connected in series with the cathode of the diode and in parallel with the load circuitry.

In another embodiment, a switch mode power supply includes a power converter circuit, a transistor switch and the energy-harvesting circuit, which is configured to harvest energy from the power converter circuit. The power converter circuit includes a first transformer having a first primary winding, a first secondary winding and a first magnetic core shared therebetween. The transistor switch has a drain electrically connected to the first primary winding and a source electrically connected to ground. The energy-harvesting circuit is electrically connected to the transistor switch. The energy-harvesting circuit includes a second transformer, a coupling capacitor, a diode and a capacitor. The second transformer has a second primary winding, a second secondary winding and a second magnetic core shared therebetween, wherein the second primary winding is electrically connected between the drain and the source of the transistor switch. The coupling capacitor is electrically connected between the drain and the second primary winding and configured to provide a reset mechanism for the second magnetic core in the second transformer. The diode has an anode and a cathode, wherein the anode is electrically connected to the second secondary winding. The capacitor is electrically connected in series with the cathode of the diode and in parallel with load circuitry.

In yet another embodiment, an energy-harvesting circuit is configured to harvest energy from a power converter circuit within a switch mode power supply. The energy-harvesting circuit includes means for transferring excess electromagnetic energy from a transistor switch electrically connected to the power converter circuit to a magnetically isolated clamp circuit, means for storing the excess electromagnetic energy in the magnetically isolated clamp circuit, and means for powering a load circuitry by referencing the stored excess electromagnetic energy to a ground.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to energy-harvesting circuits placed in switch mode power supplies and means of harvesting energy from voltage stress in the switch mode power supplies.

Leakage inductance of the main transformer of a power converter in the switch mode power supply causes voltage stress at various locations in the switch mode power supply. The energy-harvesting circuits and means of harvesting energy disclosed herein allows voltage stress that would otherwise be dissipated as heat or EMI to be harvested and used in powering a secondary load, isolated from the main load of the switch mode power supply. The energy can be harvested from the primary side of the main transformer to power a secondary load on the secondary side of the main transformer or harvested from the secondary side of the main transformer to power a secondary load on the primary side of the main transformer. The energy can also be harvested from both the primary side and the secondary side of the main transformer and "diode-OR"-ed together to power a secondary load on either the primary side or the secondary side of the main transformer. The harvested energy may even be injected back into an input or an output of the switch mode power supply. Energy may also be harvested by pulling magnetizing energy out of a main transformer of a forward converter in the switch mode power supply in order to reset the magnetic core of the main transformer. The harvested energy is used to generate a positive, a negative, or a bipolar power supply output or injected back into an input or an output of the switch mode power supply. Accordingly, the embodiments described herein demonstrate a powerful and efficient technique of harvesting energy that would have otherwise caused voltage stress, EMI or heat dissipation in the switch mode power supply. It is contemplated that the embodiments may be applicable in a wide variety of applications such as, but not limited, to space applications.

Figure 1:
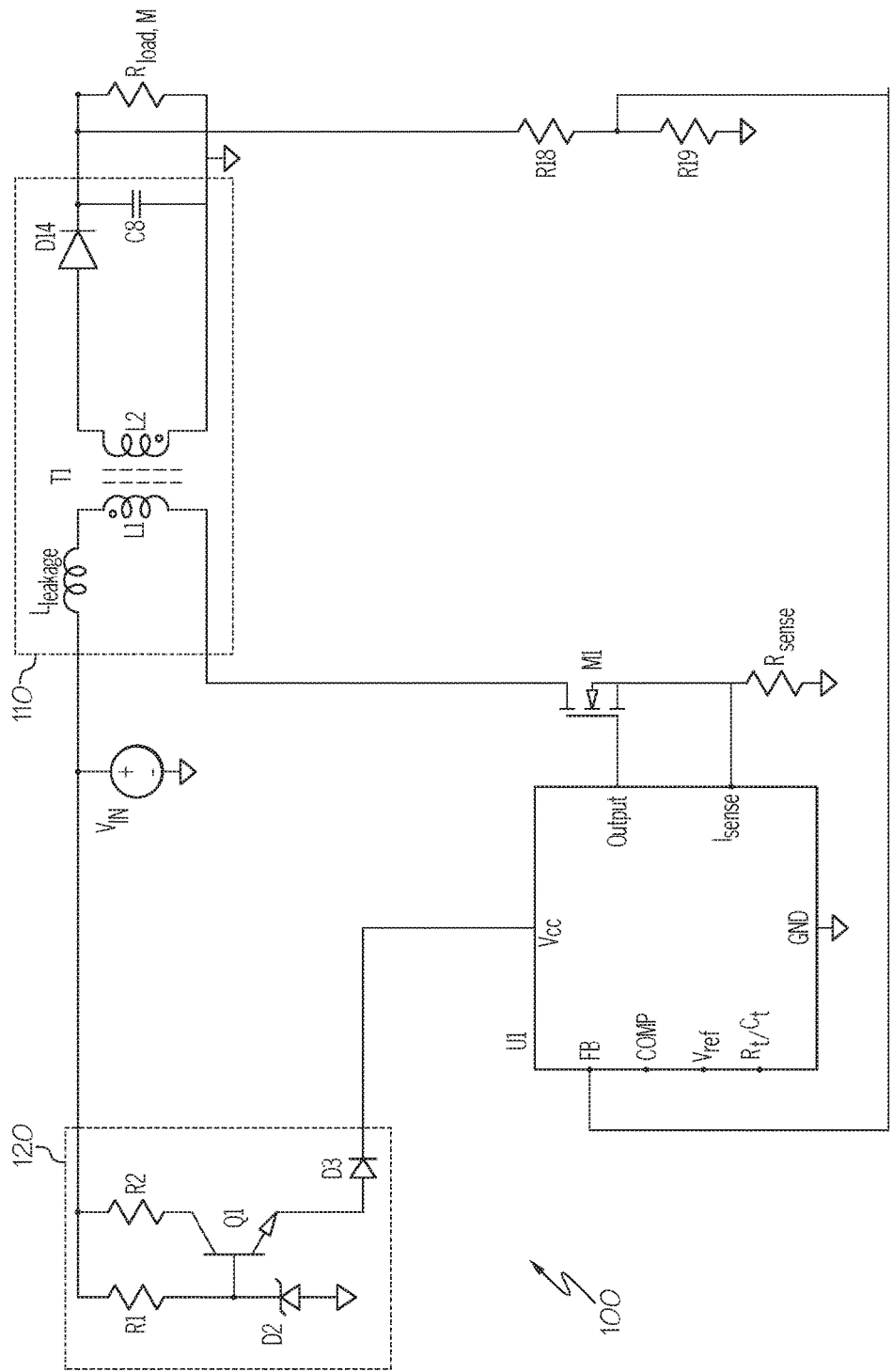
FIG. 1 schematically depicts a switch mode power supply as known in the prior art, according to one or more embodiments described and illustrated herein.

FIG. 1 schematically depicts a switch mode power supply 100, as known in the prior art, for powering a main load $R_{load,M}$. The switch mode power supply 100 includes a voltage source $V_{IN}$, a power converter circuit 110, a Startup Regulator 120, a Pulse Width Modulation (PWM) controller U1 and a transistor switch M1 that drives the power converter circuit 110. In the embodiment shown in FIG. 1, the power converter circuit 110 is a flyback converter circuit, which is based on a transformer having windings of opposite-polarity. Flyback converter circuits store magnetic energy in the air gap of the magnetic core of the transformer when the primary power supply switch is turned on and transfer the magnetic energy from the primary side to the secondary side as electric current when the primary power supply switch is turned off. Flyback converter circuits are most suitable for power supply systems below 150 W because of the unique features of isolation between primary and secondary sides, simple circuit architecture, few components, low cost, etc. The power converter circuit 110 may include a first transformer T1, depicted as the main transformer, an output rectifier D14 and a capacitor C8. The first transformer T1 has a first primary winding, L1 and a first secondary winding, L2. The first primary winding L1 and the first secondary winding L2 share a magnetic core between them. The leakage inductance of the power converter circuit 110 is depicted as an inductor $L_{leakage}$ connected in series to the first primary winding L1.

The Startup Regulator 120 is a circuit configured to obtain input from the voltage source $V_{IN}$ and provide supply voltage to the PWM controller U1 for controlling the transistor switch M1. During startup, the PWM controller U1 may not be fully operational to drive the transistor switch M1. The Startup Regulator 120 enables the PWM controller U1 to receive current from the voltage source $V_{IN}$ to generate a supply voltage for turning on the transistor switch M1. Once the supply voltage increases to a level sufficient to operate the transistor switch M1, the Startup Regulator 120 may turn off.

The PWM controller U1 is configured to generate a control signal that is output at the gate of the transistor switch M1 and drive the transistor switch M1. The control signal regulates the duty cycle at the transistor switch M1 based on feedback signal received on the feedback pin FB from the main load $R_{load,M}$ and the current sense signal received on the current sense pin, $I_{sense}$ from a resistor $R_{sense}$ connected to the transistor switch M1.

The transistor switch M1 is placed on the primary side of the first transformer T1 in the power converter circuit 110. The transistor switch M1 has a drain electrically connected to the first primary winding L1 of the power converter circuit 110 and a source electrically connected to ground via the resistor $R_{sense}$. The transistor switch M1 is the primary power supply switch for turning on and off the power converter circuit 110 based on input from the PWM controller U1. In some embodiments, the transistor switch M1 may be a metal-oxide-semiconductor field-effect transistor (MOSFET) switch or a bipolar junction transistor (BJT).

Figure 2:
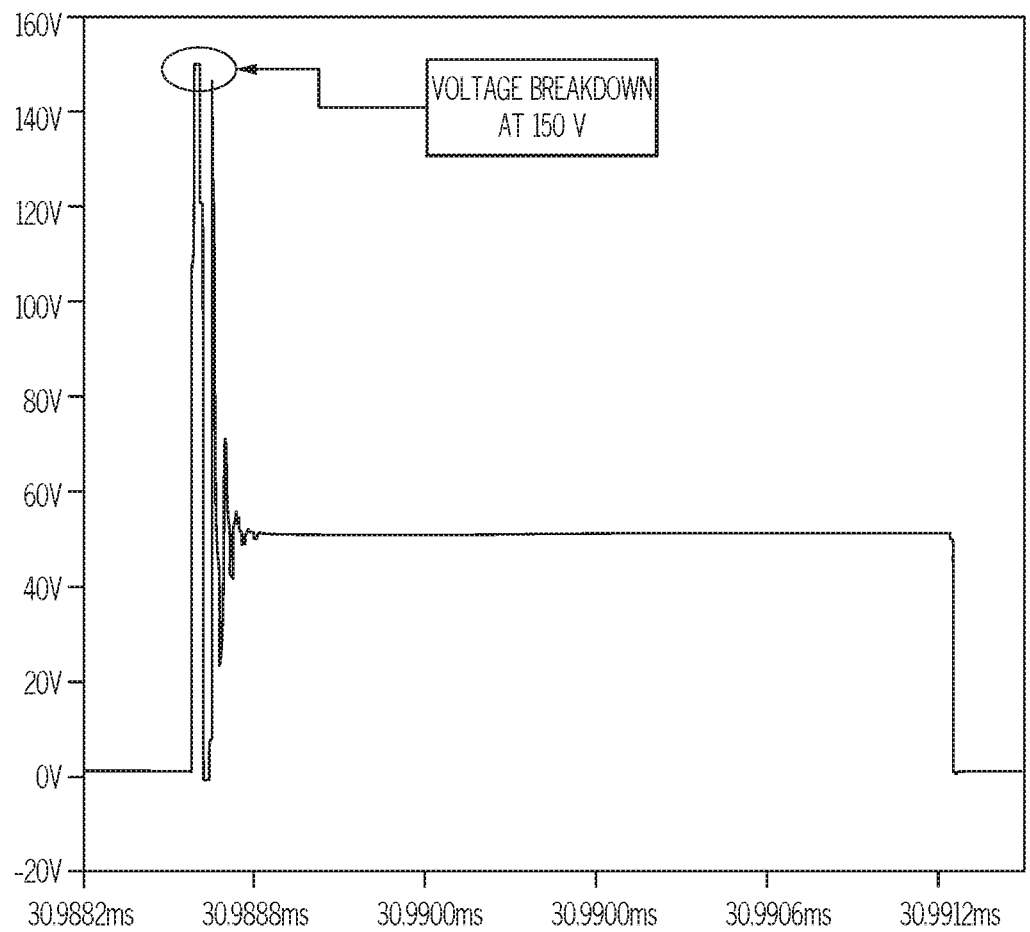
FIG. 2 graphically depicts voltage stress at a primary power supply switch of a switch mode power supply as known in the prior art, according to one or more embodiments described and illustrated herein.

FIG. 2 graphically depicts voltage stress at the transistor switch M1 of the switch mode power supply 100 caused by interrupting current through the leakage inductance of the first transformer T1. Leakage inductance in a transformer, such as the first transformer T1, results from the imperfect magnetic linking of the windings of the transformer. The interrupting current passing through the leakage inductance causes significant voltage spikes at various locations in the power supply and may eventually cause the transistor switch M1 to break down at its 150V rating upon turnoff, as shown in FIG. 2. FIG. 2 further shows fluctuation of the voltage stress, demonstrated by the ringing curve after the voltage spike until the voltage stress settles to a square waveform. The current disclosure overcomes this significant issue.

Figure 3:
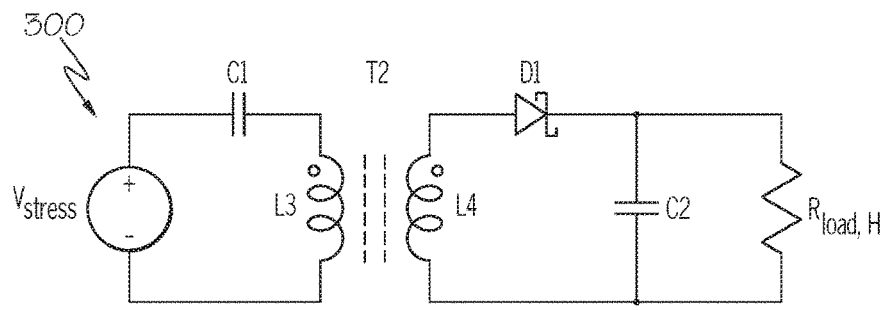
FIG. 3 schematically depicts an energy-harvesting circuit configured to harvest energy from a power converter circuit within a switch mode power supply, according to one or more embodiments described and illustrated herein.

FIG. 3 schematically depicts an example energy-harvesting circuit 300 configured to harvest energy from the power converter circuit 110 within the switch mode power supply 100. The energy-harvesting circuit 300 can be placed across any source of repetitive voltage stress to harvest excess electromagnetic energy. The energy-harvesting circuit 300 harvests the excess electromagnetic energy due to the repetitive voltage stress, passes it across an isolation barrier, references the energy to a secondary ground, and transforms it into a power supply for powering a ground-referenced load circuitry $R_{load,H}$.

The energy-harvesting circuit 300 includes a second transformer T2 having a second primary winding L3 and a second secondary winding L4. The second primary winding L3 and the second secondary winding L4 share a magnetic core between them. The second transformer T2 may be a commercial or space-grade component with varying turn-ratios. In some embodiments, the second transformer T2 is a planar transformer, using printed wiring board (PWB) traces as windings and has a set of magnetic cores glued to the PWB.

The second primary winding L3 can be electrically connected to any circuit having excess electromagnetic energy due to voltage stress such as, but not limited to, between the drain and the source of the transistor switch M1 in the switch mode power supply 100, when large voltage spikes are caused by interrupting current through the leakage inductance of the first transformer T1. A coupling capacitor C1 is electrically connected between the circuit having excess electromagnetic energy and the second primary winding L3. The coupling capacitor C1 is configured to provide a reset mechanism for the magnetic core in the second transformer T2 every switching cycle, where each switching cycle includes one turn-on and one turn-off of the transistor switch M1.

The secondary side of the second transformer T2 has a diode D1. The diode D1 may be a Zener diode, a Schottky diode or a p-n diode. The anode of the diode D1 is electrically connected to the second secondary winding L4. The cathode of the diode D1 is electrically connectable to the load circuitry $R_{load,H}$. An output capacitor C2 is electrically connected in series with the cathode of the diode D1 and in parallel with the load circuitry $R_{load,H}$. The diode D1, the capacitor C2 and the load circuitry $R_{load,H}$ thus form a magnetically isolated resistor capacitor diode (RCD) clamp circuit.

The transistor switch M1, the transformer T2, the coupling capacitor C1, the output capacitor C2, the diode D1 and other components may be fabricated from radiation-hardened components, such as from space-grade rad/SEE-hard to commercial grade rad/SEE-soft material such that they can survive radiation and single event effects (SEE).

Initially, the second primary winding L3 is electrically connected between the drain and the source of the transistor switch M1 in the switch mode power supply 100. When the transistor switch M1 is turned off, the voltage stress due to leakage inductance of the first transformer T1, depicted as $V_{stress}$, at the transistor switch M1 induces a voltage across the second secondary winding L4 of the second transformer T2. Current flows through the diode D1 and charges the output capacitor C2 with the electromagnetic energy generated due to magnetic flux across the second transformer T2. At this time, the second primary winding L3 looks like a short-circuit because the impedance of the output capacitor C2 is reflected to the second primary winding L3.

When the transistor switch M1 is turned on, there is no voltage stress and thus no induced voltage across the second secondary winding L4 of the second transformer T2 and the output capacitor C2 discharges to supply the harvested electromagnetic energy as current to the load circuitry $R_{load,H}$. The diode D1 prevents the electromagnetic energy stored in the output capacitor C2 from being discharged by the second transformer T2. The coupling capacitor C1 forces a Volt-seconds balance across the second primary winding L3 to reset the magnetic core of the second transformer T2. The process is repeated at the switching frequency of the power converter circuit 110.

If any point between the cathode of the diode D1 and the output capacitor C2 is grounded, then a negative power supply rail is generated. If any point of the load circuitry $R_{load,H}$ opposite to the cathode of the diode D1 is grounded, then a positive supply rail is generated. If a center tap on the second secondary winding L4 of the second transformer T2 is grounded, then bipolar (+/−) power supply rails are generated. The power supply rail(s) thus generated to power the load circuitry $R_{load,H}$ can be grounded to a primary ground, a secondary ground, a chassis or left floating.

Figure 4:
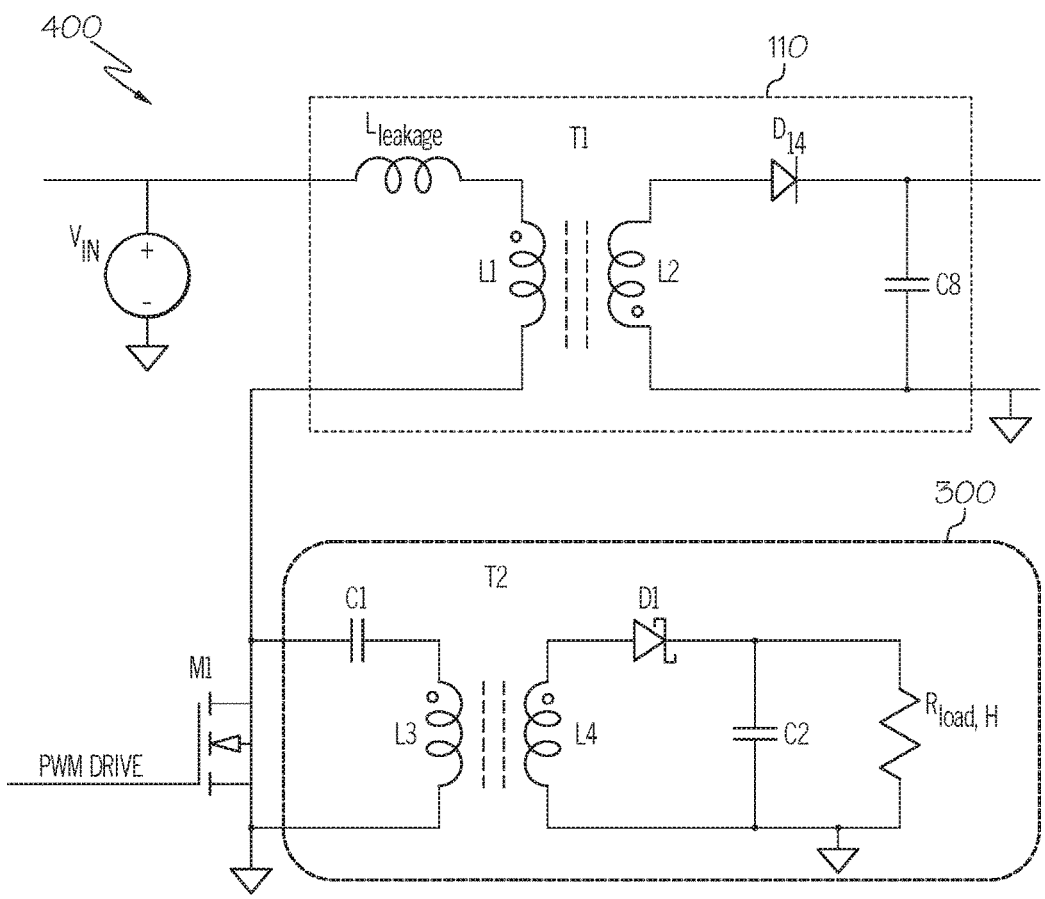
FIG. 4 schematically depicts a first example configuration of the energy-harvesting circuit of FIG. 3 placed across the primary power supply switch of a switch mode power supply and configured to harvest leakage inductance energy from the main transformer therein, according to one or more embodiments described and illustrated herein.

FIG. 4 schematically depicts a first example configuration of the energy-harvesting circuit 300 of FIG. 3 placed across the transistor switch M1 (the primary power supply switch) of the switch mode power supply 400. The energy-harvesting circuit 300 placed in the switch mode power supply 400 is configured to harvest leakage inductance energy from the first transformer T1 and generate a power supply rail to supply the harvested leakage inductance energy as current to the load circuitry $R_{load,H}$. For example, the leaked inductance energy of the voltage source $V_{stress}$ may be harvested to create a 1.4 W power supply for the load circuitry $R_{load,H}$. If any point of the load circuitry $R_{load,H}$ opposite to the cathode of the diode D1 is grounded, a +38V power supply rail is generated. If the upper end of load circuitry $R_{load,H}$ at any point between the cathode of the diode D1 and the output capacitor C2 is grounded, a −38V power supply rail is generated. If a center tap on the second secondary winding L4 of the second transformer T2 is grounded, a +19V bipolar power supply rail is generated. The power supply rail(s) thus generated to power the load circuitry $R_{load,H}$, however, are not limited to these above-mentioned values.

The example configuration of FIG. 4 offers a number of advantages. Since the generated power supply rail is isolated from the main transformer, the first transformer T1 in the power converter circuit 110, it could be tied to any ground: primary, secondary, chassis, etc., or left floating. Secondly, due to the continuous harvesting of the leaked inductance energy from the main transformer, the transistor switch M1 does not break down, when the voltage stress increases past the voltage rating of the transistor switch M1. Ultimately, the example configuration of FIG. 4 increases power supply efficiency while decreasing voltage stress at the transistor switch M1, thereby eliminating the need to use passive RCD clamps that are known in the art for otherwise reducing the voltage stress due to leakage inductance energy from the main transformer.

Figure 5:
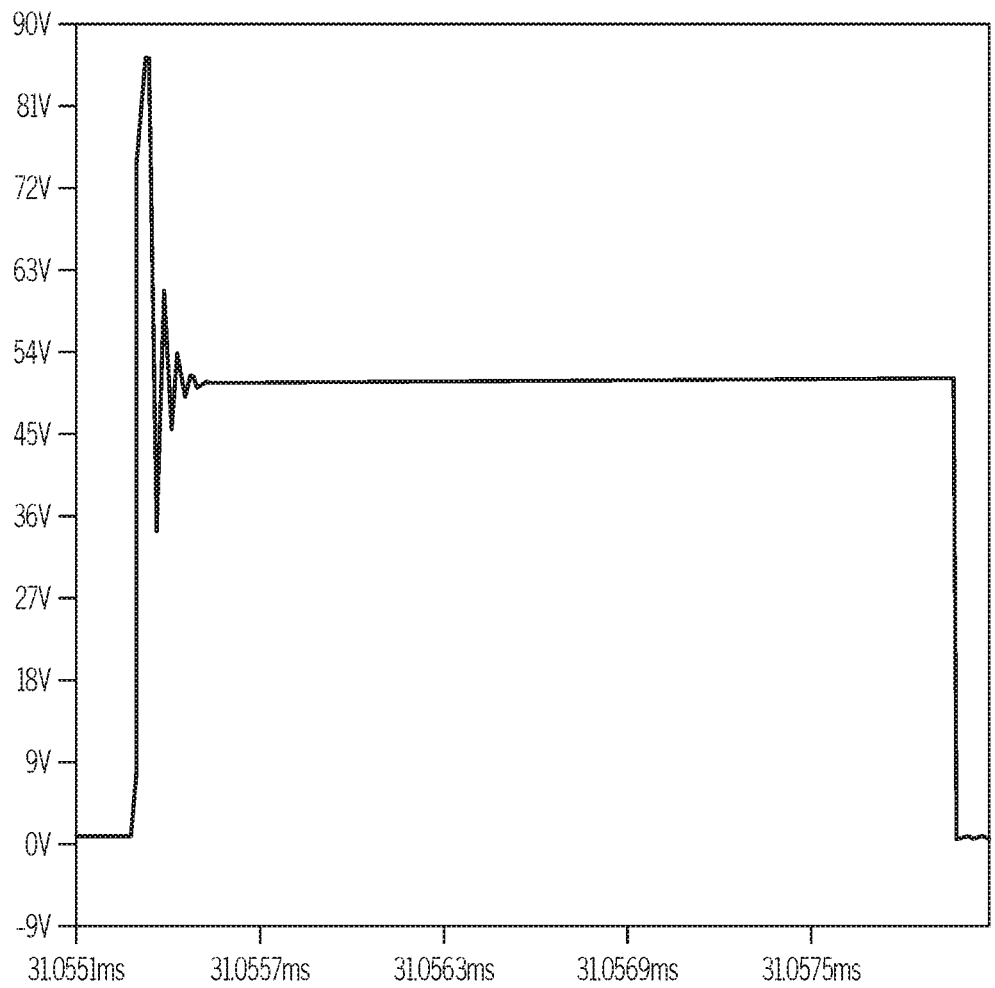
FIG. 5 graphically depicts voltage stress at the primary power supply switch of the switch mode power supply of FIG. 4, according to one or more embodiments described and illustrated herein.
Figure 6:
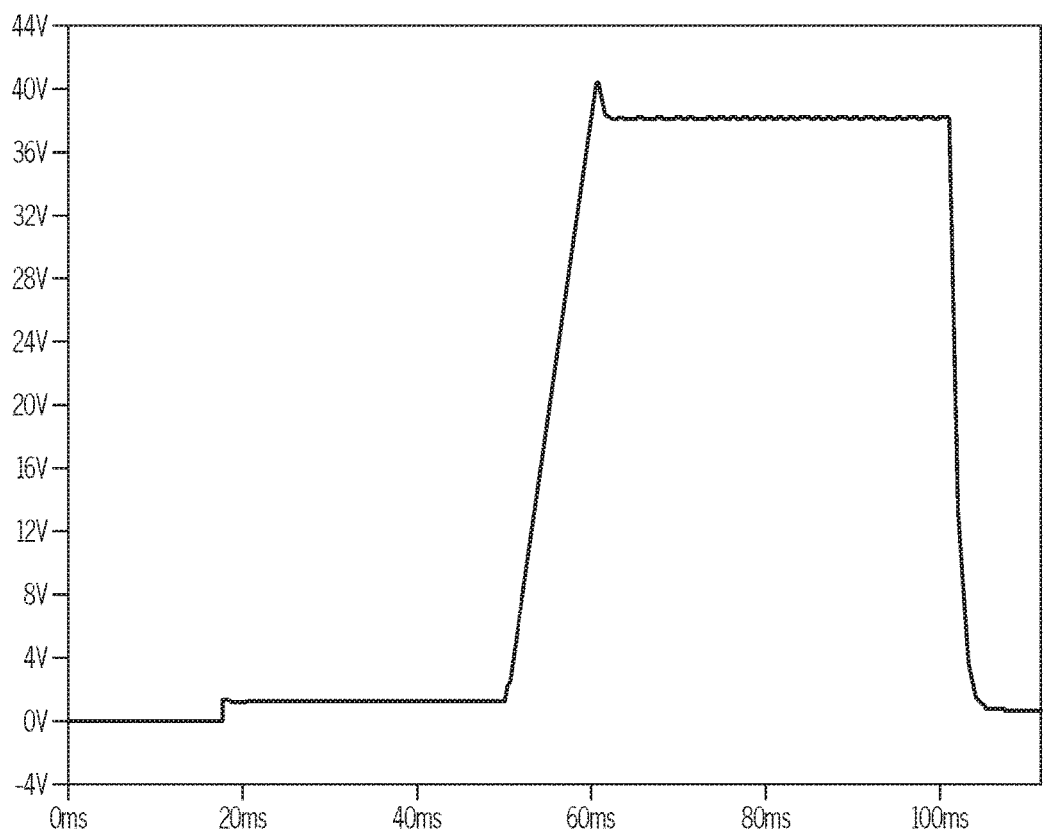
FIG. 6 graphically depicts the output voltage characteristics of the energy-harvesting circuit of FIG. 4 during power-up, steady-state and power-down operations, according to one or more embodiments described and illustrated herein.

FIG. 5 graphically depicts voltage stress at the transistor switch M1 of the switch mode power supply 400 of FIG. 4 having the energy-harvesting circuit 300, when the transistor switch M1 is off. In the example shown in FIG. 5, the voltage stress at the transistor switch M1 due to leakage inductance of the main transformer is controlled to 86V, well below 150V, the breakdown voltage of the transistor switch M1. Moreover, any fluctuation of the voltage stress, demonstrated by the ringing curve after the voltage spike, is minimized before the voltage stress levels reduce and eventually disappear. FIG. 6 graphically depicts the output voltage characteristics of the power supply rails generated by harvesting the leakage inductance energy of the first transformer T1 of FIG. 4 during power-up, steady-state and power-down operations of the transistor switch M1.

Figure 7:
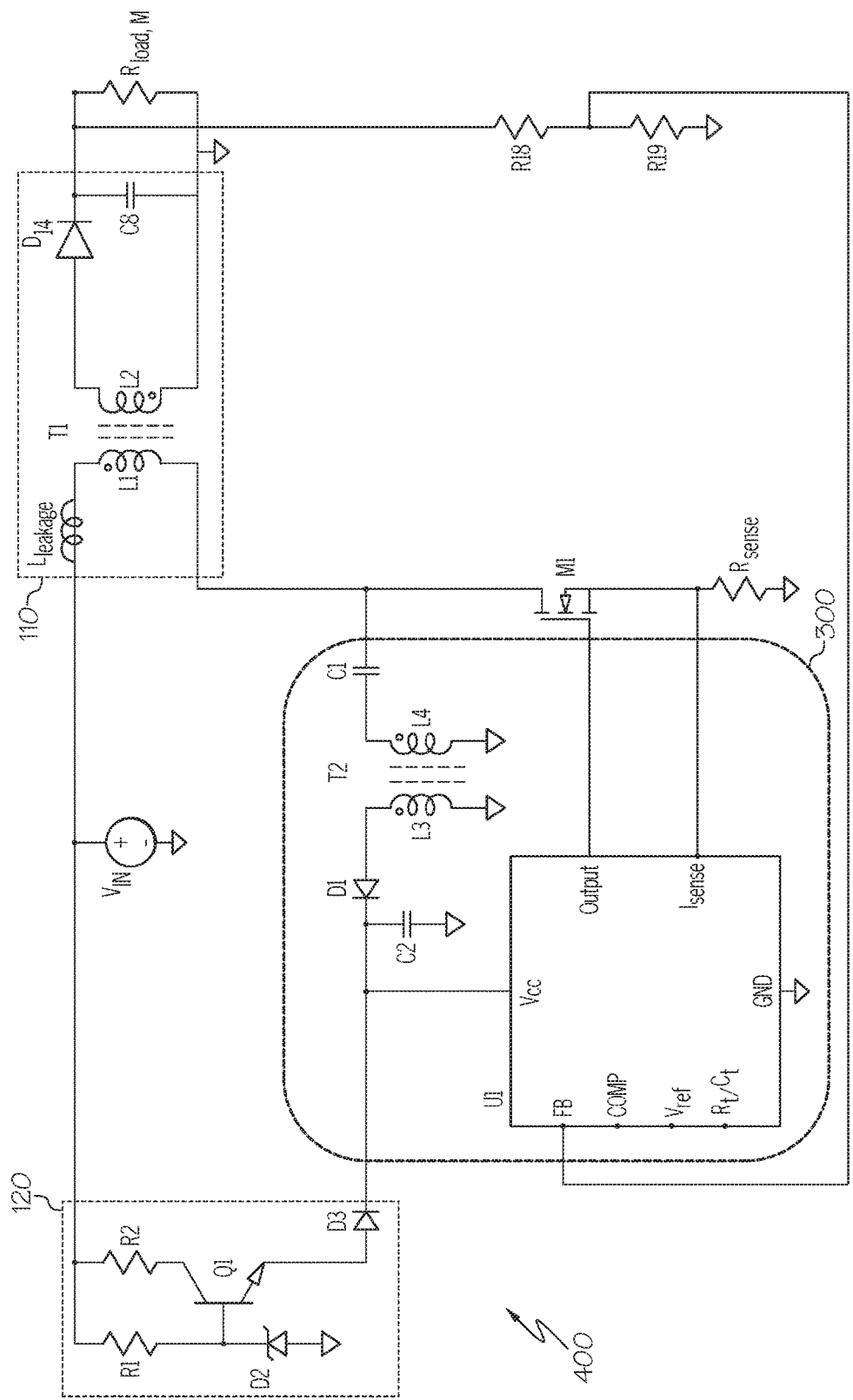
FIG. 7 schematically depicts a second example configuration of the energy-harvesting circuit of FIG. 3 placed across the primary power supply switch of a switch mode power supply and configured to power a pulse width modulator (PWM) controller using leakage inductance energy harvested from the main transformer therein, according to one or more embodiments described and illustrated herein.

FIG. 7 schematically depicts a second example configuration of the energy-harvesting circuit 300 of FIG. 3 placed across the transistor switch M1 (the primary power supply switch) of a switch mode power supply 400. The switch mode power supply 400 has the power converter circuit 110, described above. The power converter circuit 110 is a flyback converter circuit. The energy-harvesting circuit 300 is configured to harvest leakage inductance energy from the first transformer T1, when the transistor switch M1 turns off and power the PWM controller U1 using the leakage inductance energy harvested. Thus, the PWM controller U1 replaces the load circuitry $R_{load,H}$ of FIG. 4. The diode D1, the capacitor C2 and the PWM controller U1 form a magnetically isolated RCD clamp circuit.

The energy-harvesting circuit 300 in FIG. 7 offers a simple and efficient way of powering the PWM controller U1. The PWM controller U1 is powered with increased efficiency by using the harvested leakage inductance energy from the first transformer T1. The voltage generated by the energy-harvesting circuit 300 is higher than the voltage generated by the Startup Regulator 120, which shuts down once the PWM controller U1 is operating in steady-state. Without the energy-harvesting circuit 300, the leakage inductance energy from the first transformer T1 would have been dissipated as heat in a passive RCD clamp that is known in the art for otherwise reducing the voltage stress in the transistor switch M1 due to the leakage inductance energy. The energy-harvesting circuit 300 eliminates the need for the passive RCD clamp. The energy-harvesting circuit 300 also eliminates the need for any auxiliary winding in the main transformer, the first transformer T1 for powering the PWM controller U1 after startup.

Figure 8:
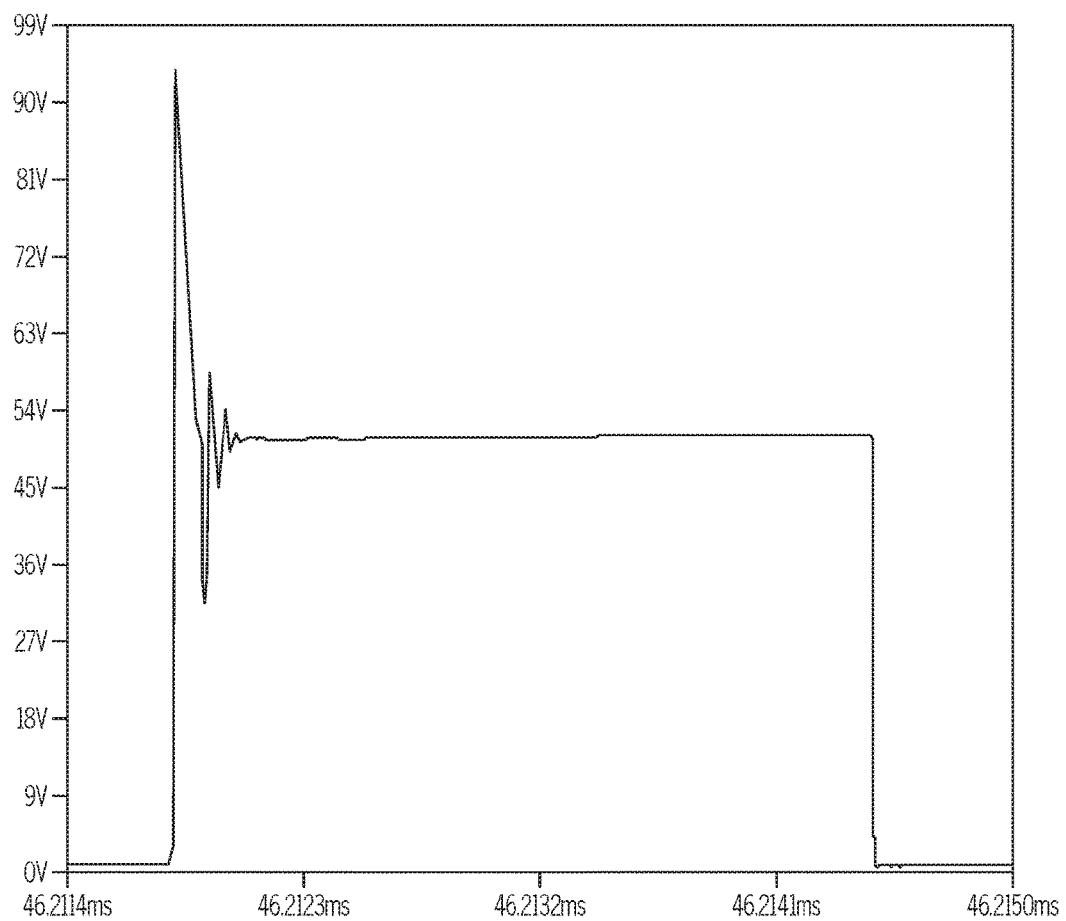
FIG. 8 graphically depicts voltage stress at the primary power supply switch of the switch mode power supply of FIG. 7, according to one or more embodiments described and illustrated herein.

FIG. 8 graphically depicts voltage stress at the transistor switch M1 of the switch mode power supply 400 of FIG. 7 having the energy-harvesting circuit 300, when the transistor switch M1 turns off. In the example shown in FIG. 8, the voltage stress at the transistor switch M1 due to leakage inductance of the main transformer is clamped to 94V, well below 150V, the breakdown voltage of the transistor switch M1. Moreover, any fluctuation of the voltage stress, demonstrated by the ringing curve after the voltage spike, is minimized before the voltage stress levels reduce and eventually disappear.

Figure 9:
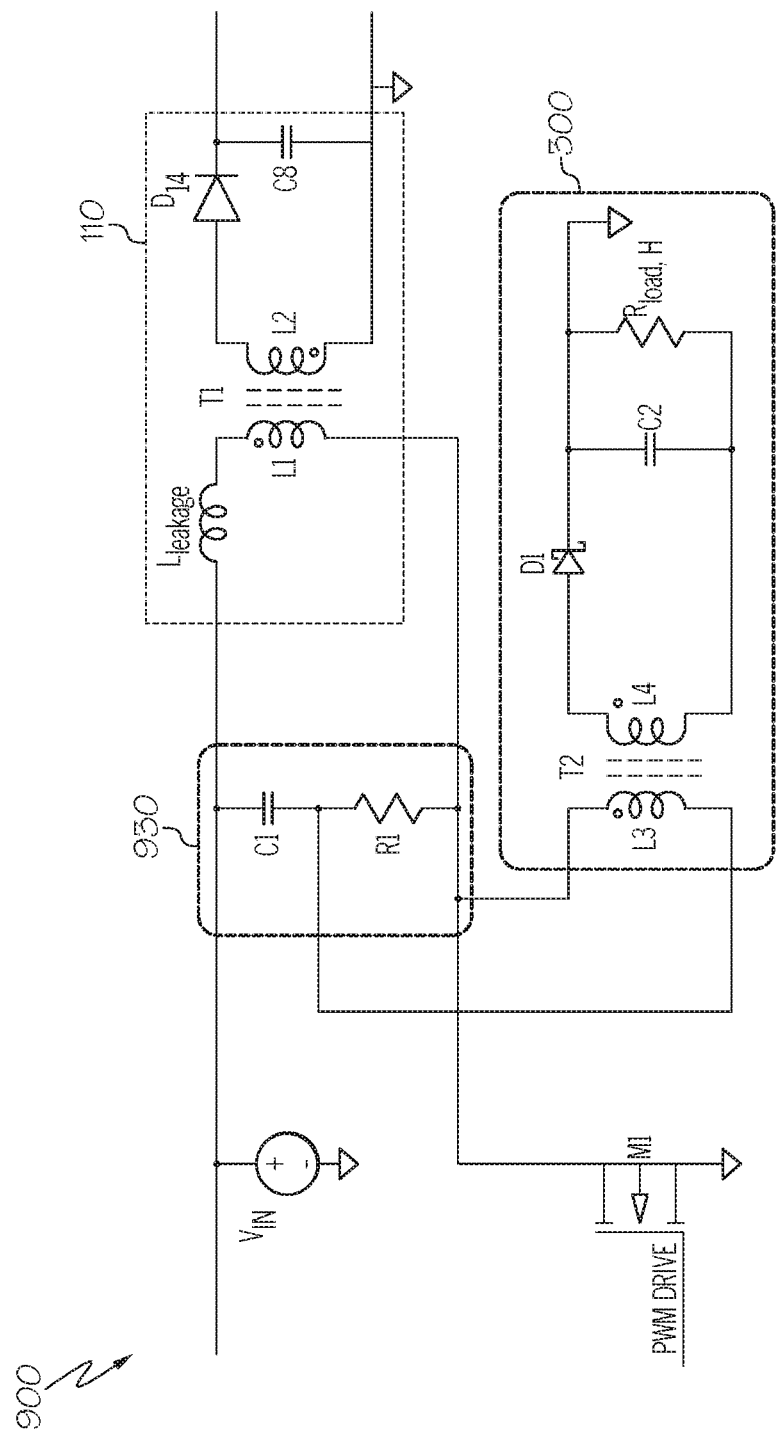
FIG. 9 schematically depicts a third example configuration of the energy-harvesting circuit of FIG. 3 placed across the primary power supply switch of a switch mode power supply to harvest leakage inductance energy from the primary side of the main transformer therein through a resistor-capacitor (RC) snubber circuit, according to one or more embodiments described and illustrated herein.

FIG. 9 schematically depicts a third example configuration of the energy-harvesting circuit 300 of FIG. 3 configured to harvest leakage inductance energy from a switch mode power supply 900 having a resistor capacitor (RC) snubber circuit 930. The switch mode power supply 900 has the power converter circuit 110, described above. The power converter circuit 110 is a flyback converter circuit. The RC snubber circuit 930 could be electrically connected to either the primary side or the secondary side of the main transformer.

In the embodiment shown in FIG. 9, the RC snubber circuit 930 is electrically connected to the first primary winding L1 of the first transformer T1 of the switch mode power supply 900. The RC snubber circuit 930 includes a capacitor C1 in series with a resistor R1. The capacitor C1 is electrically connected to the voltage source $V_{IN}$ at one end and the resistor R1 at the other end. The RC snubber circuit 930 reduces EMI and dampens the ringing effect of voltage stress caused due to leakage inductance energy from the first transformer T1 by dissipating the leakage inductance energy has heat.

The energy-harvesting circuit 300 in FIG. 9 is electrically connected between the two ends of the resistor R1 of the RC snubber circuit 930. The capacitor C1 functions as the coupling capacitor C1 (shown in FIG. 3) configured to provide a reset mechanism for the magnetic core in the second transformer T2 every switching cycle. The energy-harvesting circuit 300 harvests leakage inductance energy from the primary side of the first transformer T1 through the RC snubber circuit 930. The harvested energy is used to generate a power supply rail to power the load circuitry $R_{load,H}$, which effectively becomes a resistor in parallel with the resistor R1 in the RC snubber circuit 930. In some embodiments, the energy-harvesting circuit 300 may be positioned so as to move the resistor R1 to the secondary side of the second transformer T2. In other embodiments, the resistor R1 may be eliminated and replaced entirely by the load circuitry $R_{load,H}$.

In the embodiment shown in FIG. 9, the energy-harvesting circuit 300 generates a negative power supply rail by grounding the upper end of load circuitry $R_{load,H}$ at any point between the cathode of the diode D1 and the output capacitor C2. For example, a −27V power supply rail may be generated which provides 0.7 W power to the load circuitry $R_{load,H}$. In other embodiments, a ±13.5 V supply may be generated by grounding a center tap on the second secondary winding L4 of the second transformer T2. The power supply rail(s) thus generated to power the load circuitry $R_{load,H}$, however, are not limited to these above-mentioned values.

The load circuitry $R_{load,H}$ is powered with increased efficiency using the harvested leakage inductance energy from the first transformer T1 that would have been otherwise dissipated as heat in the RC snubber circuit 930. The energy-harvesting circuit 300 configured to harvest energy from the RC snubber circuit 930 potentially has a wide range of applications, in light of the widespread use of RC snubber circuits in the art.

Figure 10:
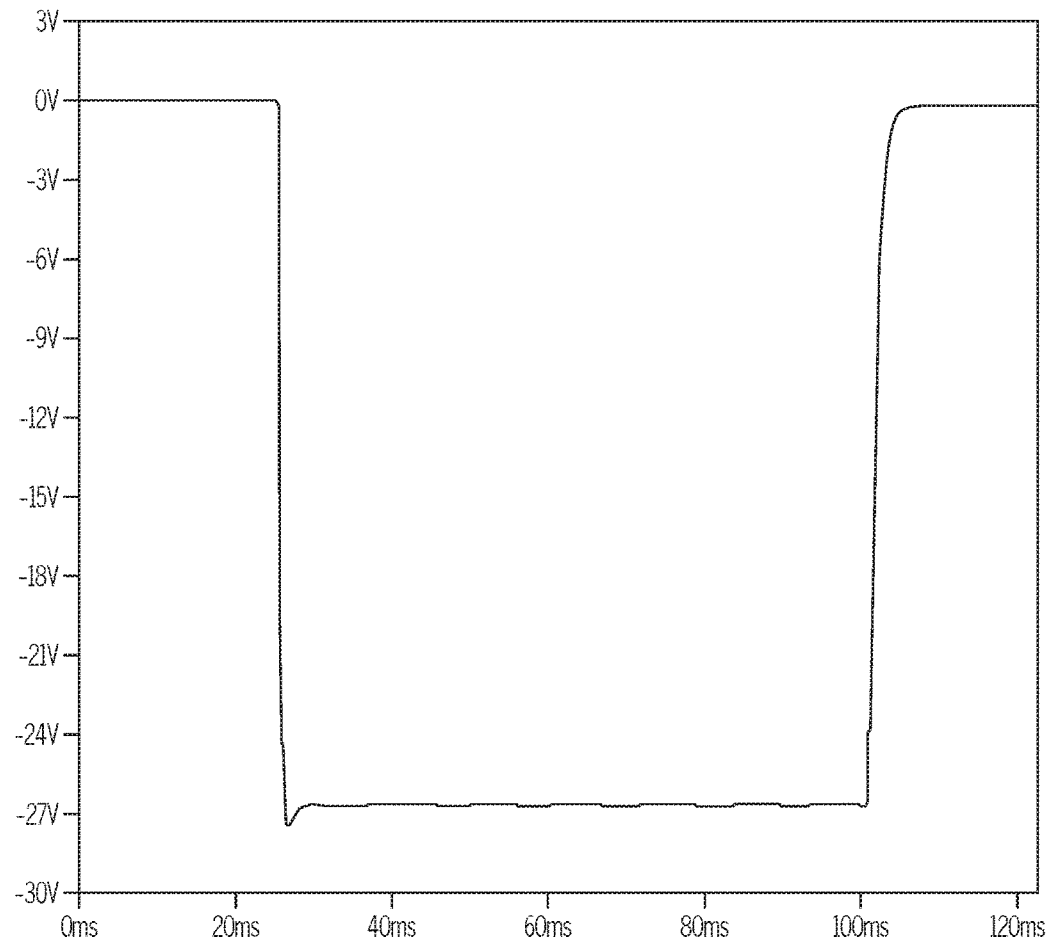
FIG. 10 graphically depicts the output voltage characteristics of the energy-harvesting circuit of FIG. 9 during power-up, steady-state and power-down operations, according to one or more embodiments described and illustrated herein.

FIG. 10 graphically depicts the output voltage characteristics of the power supply rails generated by harvesting the leakage inductance energy of the first transformer T1 of the switch mode power supply 900 of FIG. 9 during power-up, steady-state and power-down operations of the transistor switch M1.

Figure 11:
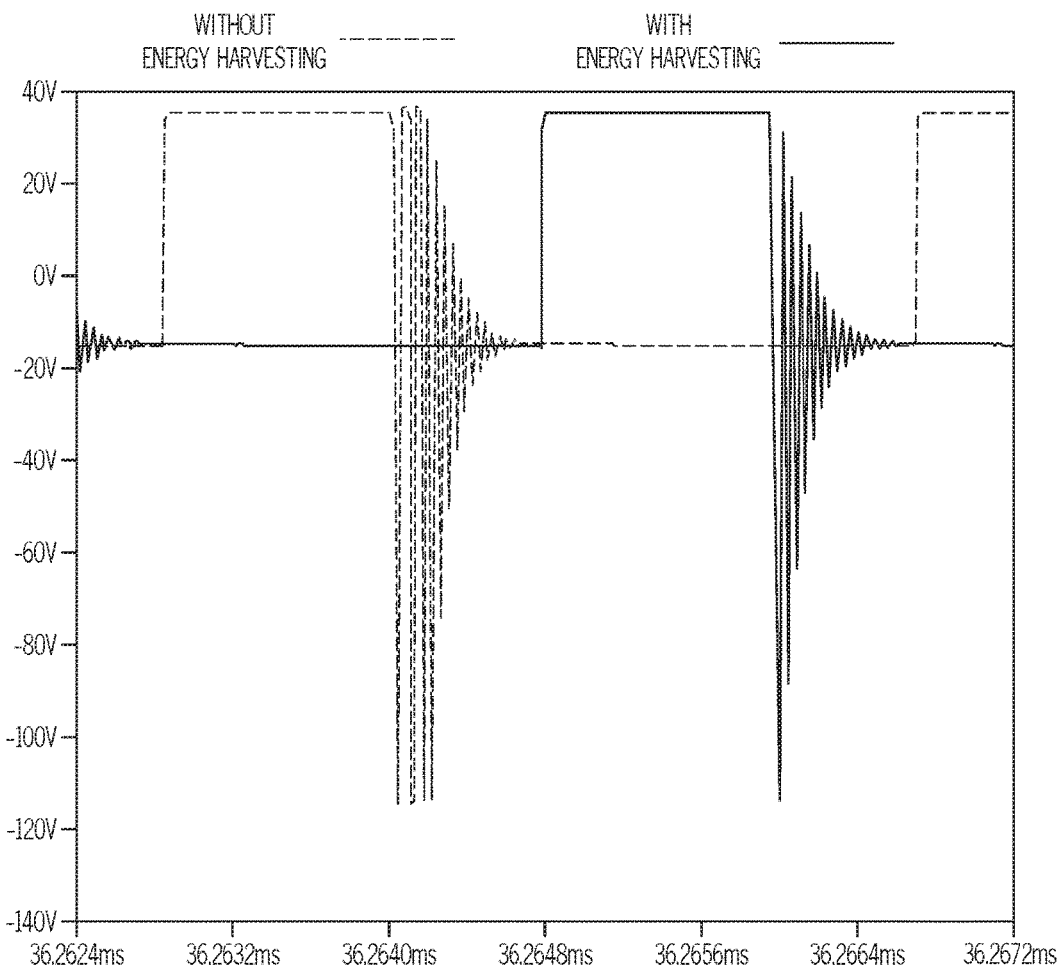
FIG. 11 graphically compares output voltage characteristics across an RC snubber on the primary side of the main transformer within the switch mode power supply without having the energy-harvesting circuit of FIG. 3 (dashed lines) and having the energy-harvesting circuit of FIG. 3 (solid lines), according to one or more embodiments described and illustrated herein.

FIG. 11 graphically compares voltage stress across the RC snubber circuit 930 of FIG. 9, with and without the energy-harvesting circuit 300 electrically connected to the RC snubber circuit 930, when the transistor switch M1 turns off. Without the energy-harvesting circuit 300 (shown in dashed lines), the voltage stress curve rings for a longer time, indicating prolonged fluctuation of the voltage stress. This is because the leakage inductance energy causing the voltage stress is slowly dissipated as heat in the RC snubber circuit 930. On the other hand, when the energy-harvesting circuit 300 is electrically connected to the RC snubber circuit 930 (shown in solid lines), the voltage stress curve rings for a shorter time, indicating that the fluctuation of the voltage stress is quickly minimized by the energy-harvesting circuit 300. This is because the leakage inductance energy causing the voltage stress is harvested for powering the load circuitry $R_{load,H}$ increasing power supply efficiency and reducing EMI in the process.

Figure 12:
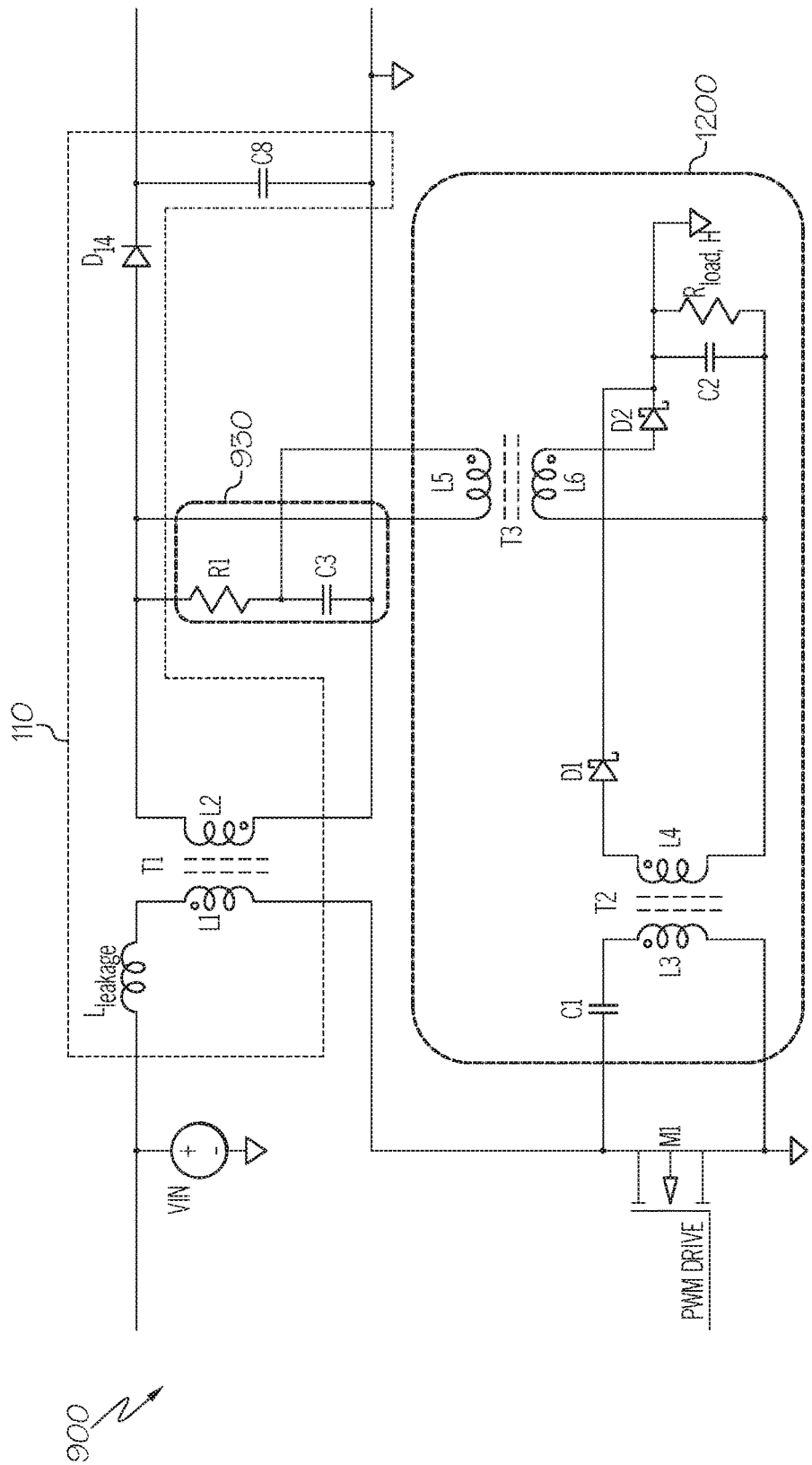
FIG. 12 depicts a fourth example configuration of a first energy-harvesting circuit (shown in FIG. 3) placed across the primary power supply switch of a switch mode power supply to harvest leakage inductance energy from the main transformer therein and a second energy-harvesting circuit placed on the secondary side of the main transformer to harvest leakage inductance energy from the secondary side of the main transformer therein through an RC snubber, according to one or more embodiments described and illustrated herein.

FIG. 12 schematically depicts a fourth example configuration of an energy-harvesting circuit 1200 configured to harvest leakage inductance energy from the switch mode power supply 900 having the RC snubber circuit 930 electrically connected to the first secondary winding L2 on the secondary side of the first transformer T1. The switch mode power supply 900 has the power converter circuit 110, described above. The power converter circuit 110 is a flyback converter circuit. The RC snubber circuit 930 in FIG. 12 includes a resistor R1 in series with a capacitor C3. The resistor R1 is electrically connected to the first secondary winding L2 on one end and the capacitor C3 on the other end.

The energy-harvesting circuit 1200 is similar to the energy-harvesting circuit 300 (shown in FIG. 3) but has two transformers-a second transformer T2 and a third transformer T3. The second transformer T2 is placed across the transistor switch M1 (the primary power supply switch) of the switch mode power supply 900 and configured to harvest leakage inductance energy from the primary side of the first transformer T1. The second transformer T2 has a second primary winding L3 and a second secondary winding L4. The second primary winding L3 and the second secondary winding L4 share a magnetic core between them. A coupling capacitor C1 is electrically connected between the transistor switch M1 and the second primary winding L3. The coupling capacitor C1 is configured to provide a reset mechanism for the magnetic core in the second transformer T2 every switching cycle. The secondary side of the second transformer T2 has a diode D1. The diode D1 may be a Zener diode, a Schottky diode or a p-n diode. The anode of the diode D1 is electrically connected to the second secondary winding L4. The cathode of the diode D1 is electrically connectable to the load circuitry $R_{load,H}$. An output capacitor C2 is electrically connected in series with the cathode of the diode D1 and in parallel with the load circuitry $R_{load,H}$.

The third transformer T3 is electrically connected between the two ends of the resistor R1 of the RC snubber circuit 930 and configured to harvest leakage inductance energy from the secondary side of the first transformer T1 that would have otherwise been dissipated as heat in the RC snubber circuit 930. The third transformer T3 has a third primary winding L5 and a third secondary winding L6. The third primary winding L5 and the third secondary winding L6 share a magnetic core between them. The capacitor C3 functions as the coupling capacitor C1 (shown in FIG. 3) configured to provide a reset mechanism for the magnetic core in the third transformer T3 every switching cycle. The secondary side of the third transformer T3 has a diode D2 similar to the diode D1. The anode of the diode D2 is electrically connected to the third secondary winding L6. The cathode of the diode D2 is electrically connectable to the load circuitry $R_{load,H}$. The output capacitor C2 is electrically connected in series with the cathode of the diode D2.

When the transistor switch M1 (the primary power supply switch) turns off, the leakage inductance energy on the primary side of the first transformer T1 causes voltage stress across the transistor switch M1. On the other hand, when the output rectifier D14 turns off to block current flow into the capacitor C8, the leakage inductance energy on the secondary side of the first transformer T1 causes voltage stress across the resistor R1 of the RC snubber circuit 930. The leakage inductance energy from the primary side and the secondary side of the first transformer T1 is harvested and added by the energy-harvesting circuit 1200 and then used to generate a power supply rail to power the ground-referenced load circuitry $R_{load,H}$. Thus, the energy-harvesting circuit 1200 operates at two times the switching frequency of the switch mode power supply 900.

In the embodiment shown in FIG. 12, the energy-harvesting circuit 1200 generates a negative power supply rail by grounding the upper end of load circuitry $R_{load,H}$ at any point between the intersection of the cathodes of the diodes D1 and D2 and the output capacitor C2. For example, a −55V power supply rail may be generated which provides 3 W power to the load circuitry $R_{load,H}$. On the other hand, if any point of the load circuitry $R_{load,H}$ opposite to the cathodes of the diodes D1 and D2 is grounded, a +55V power supply rail can be generated. The power supply rail(s) thus generated to power the load circuitry $R_{load,H}$, however, are not limited to these above-mentioned values. The load circuitry $R_{load,H}$ is thus powered with increased efficiency using the harvested leakage inductance energy from both the primary and the secondary sides of the first transformer T1.

Figure 13:
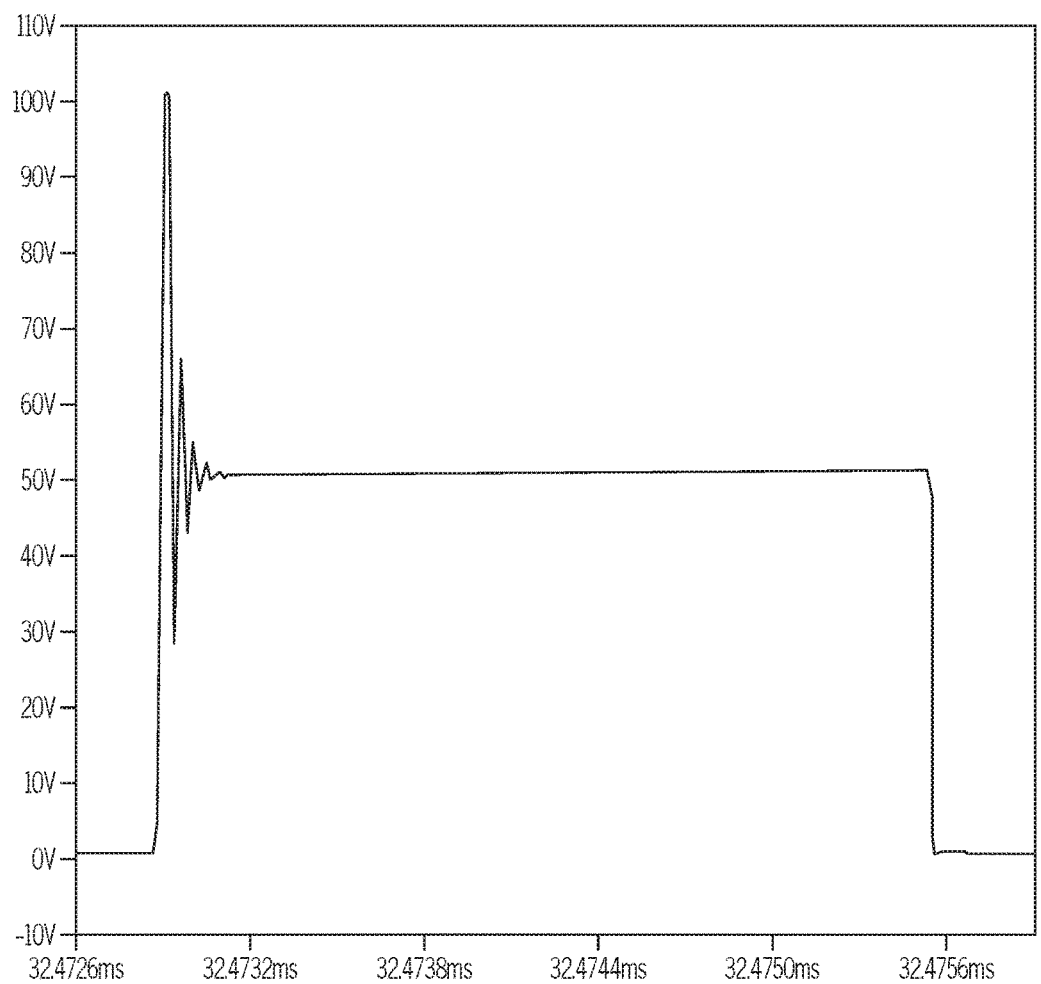
FIG. 13 graphically depicts voltage stress at the primary power supply switch of the switch mode power supply of FIG. 12, according to one or more embodiments described and illustrated herein.

FIG. 13 graphically depicts voltage stress at the transistor switch M1 (the primary power supply switch) of the switch mode power supply 900 in FIG. 12 having the energy-harvesting circuit 1200, when the transistor switch M1 turns off. In the example shown in FIG. 13, the voltage stress at the transistor switch M1 due to leakage inductance on the primary and secondary sides of the main transformer is clamped to 101V, well below 150V, the breakdown voltage of the transistor switch M1. Moreover, any fluctuation of the voltage stress, demonstrated by the ringing curve after the voltage spike, is minimized before the voltage stress levels reduce and eventually disappear.

Figure 14:
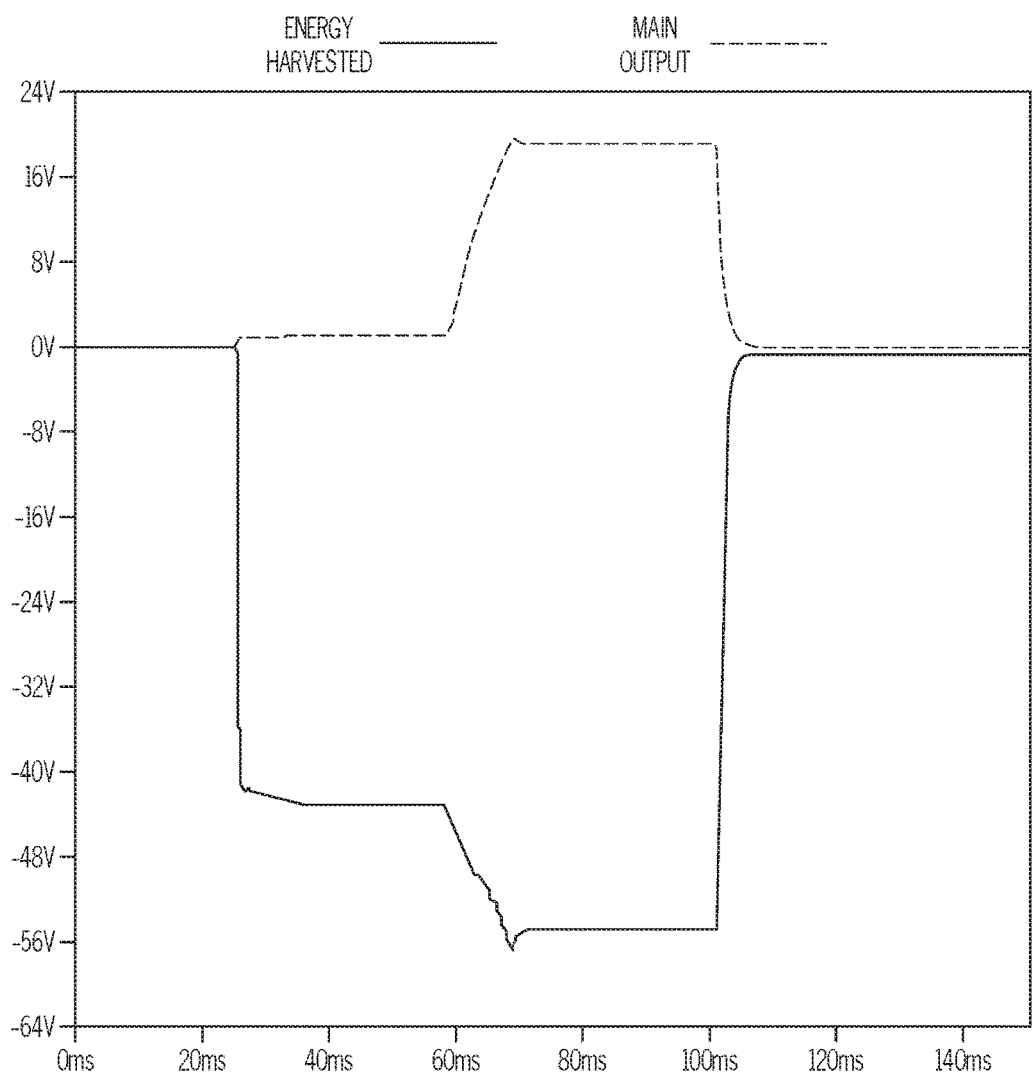
FIG. 14 graphically depicts a comparison between the voltage at the main output (dashed lines) of the switch mode power supply of FIG. 12 and the voltage at the output of the energy harvested (solid lines) from the primary and secondary sides of the main transformer of the switch mode power supply, according to one or more embodiments described and illustrated herein.

FIG. 14 graphically depicts a comparison between the output voltage characteristics at the main load $R_{load,M}$ (dashed lines) of the switch mode power supply 900 of FIG. 12 and the output voltage characteristics of the power supply rail used to power the load circuitry $R_{load,H}$ (solid lines). For the switch mode power supply 900 in FIG. 12 using the energy-harvesting circuit 1200, the voltage at the main load $R_{load,M}$ reaches a value of +20V at steady-state, while the voltage of the power supply rail generated by harvesting leakage inductance energy reaches a value of −55V at steady-state.

Figure 15:
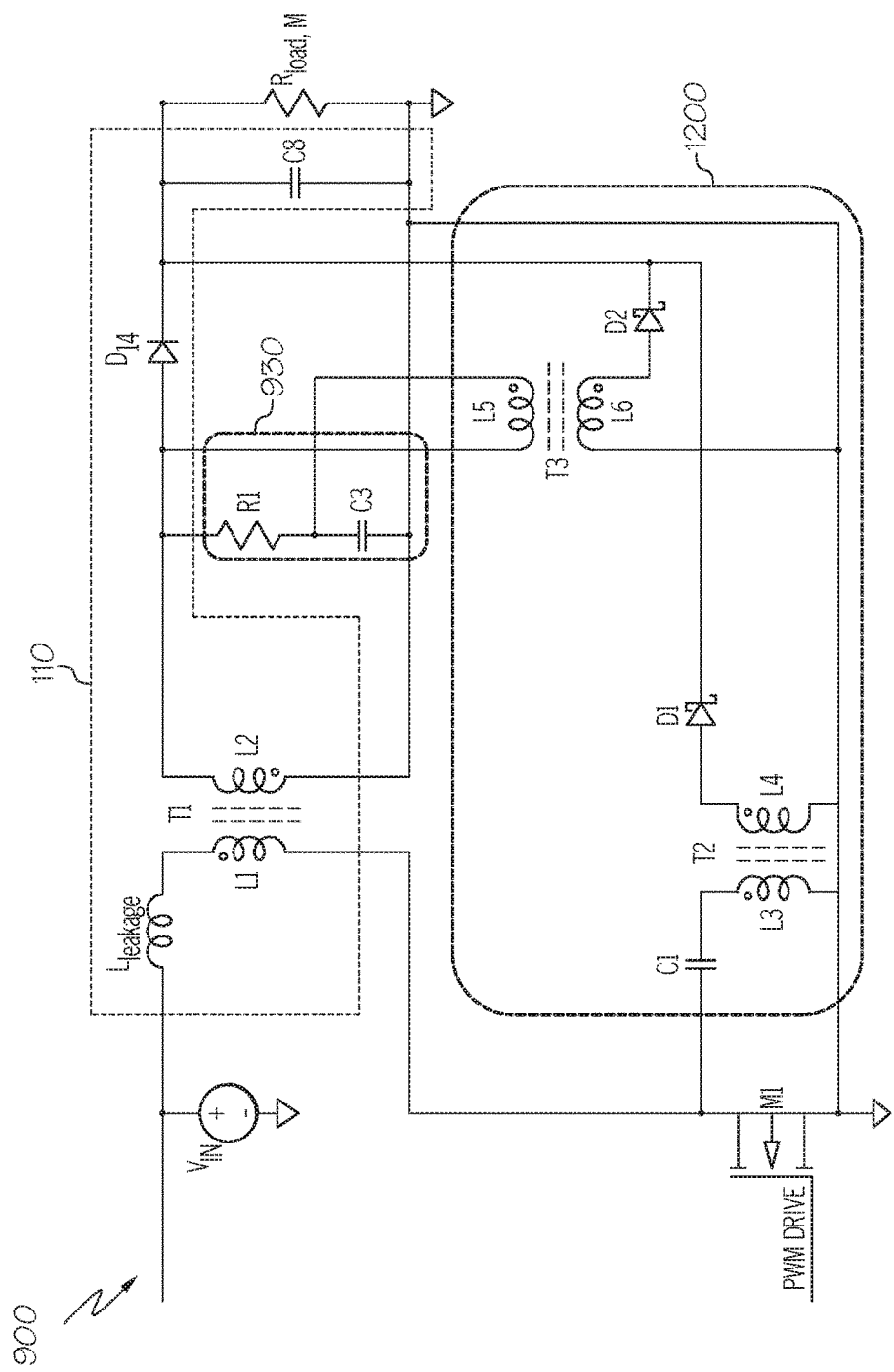
FIG. 15 depicts a fifth example configuration of the energy-harvesting circuit placed in the switch mode power supply shown in FIG. 12, where the harvested energy is injected back into the main output of the switch mode power supply, according to one or more embodiments described and illustrated herein.

FIG. 15 schematically depicts a fifth example configuration of the energy-harvesting circuit 1200 configured to harvest leakage inductance energy from the switch mode power supply 900 having the RC snubber circuit 930. The switch mode power supply 900 has the power converter circuit 110, described above. The power converter circuit 110 is a flyback converter circuit. The RC snubber circuit 930 in FIG. 15 is electrically connected to the first secondary winding L2 on the secondary side of the first transformer T1 of the switch mode power supply 900. The RC snubber circuit 930 in FIG. 15 is structurally and functionally similar to the RC snubber circuit 930 in FIG. 12.

As discussed above, the energy-harvesting circuit 1200 has two transformers—the second transformer T2 and the third transformer T3. The second transformer T2 is placed across the transistor switch M1 (the primary power supply switch) of the switch mode power supply 900 and configured to harvest leakage inductance energy from the primary side of the first transformer T1. The second transformer T2 has a second primary winding L3 and a second secondary winding L4. The second primary winding L3 and the second secondary winding L4 share a magnetic core between them. A coupling capacitor C1 is electrically connected between the transistor switch M1 and the second primary winding L3. The coupling capacitor C1 is configured to provide a reset mechanism for the magnetic core in the second transformer T2 every switching cycle. The secondary side of the second transformer T2 has a diode D1. The diode D1 may be a Zener diode, a Schottky diode or a p-n diode. The anode of the diode D1 is electrically connected to the second secondary winding L4. The cathode of the diode D1 is electrically connectable to the output of the output rectifier D14 such that the harvested leakage inductance energy from the primary side of the first transformer T1 is injected into the main output of the switch mode power supply 900. An output capacitor C8 is electrically connected in series with the cathode of the diode D1 and in parallel with the main load $R_{load,M}$ of the switch mode power supply 900.

The third transformer T3 is electrically connected between the two ends of the resistor R1 of the RC snubber circuit 930 and configured to harvest leakage inductance energy from the secondary side of the first transformer T1 that would have otherwise been dissipated as heat in the RC snubber circuit 930. The third transformer T3 has a third primary winding L5 and a third secondary winding L6. The third primary winding L5 and the third secondary winding L6 share a magnetic core between them. The capacitor C3 functions as the coupling capacitor C1 (shown in FIG. 3) configured to provide a reset mechanism for the magnetic core in the third transformer T3 every switching cycle. The secondary side of the third transformer T3 has a diode D2 similar to the diode D1. The anode of the diode D2 is electrically connected to the third secondary winding L6. The cathode of the diode D2 is electrically connectable to the output of the output rectifier D14 such that the harvested leakage inductance energy from the secondary side of the first transformer T1 is injected into the main output of the switch mode power supply 900. The output capacitor C8 is electrically connected in series with the cathode of the diode D2.

When the transistor switch M1 (the primary power supply switch) turns off, the leakage inductance energy on the primary side of the first transformer T1 causes voltage stress across the transistor switch M1. On the other hand, when the output rectifier D14 turns off to block current flow into the capacitor C8, the leakage inductance energy on the secondary side of the first transformer T1 causes voltage stress across the resistor R1 of the RC snubber circuit 930. The leakage inductance energy from the primary side and the secondary side of the first transformer T1 is harvested and injected into the output by the energy-harvesting circuit 1200. The diodes D1 and D2 operate in parallel with the output rectifier D14 such that the harvested leakage inductance energy is "diode OR"-ed into the main output of the switch mode power supply 900. As noted above, the energy-harvesting circuit 1200 operates at two times the switching frequency of the switch mode power supply 900.

The main load $R_{load,M}$ is thus powered with increased efficiency. A power supply simulation run using an RCD clamp on the primary side of the first transformer T1 and the RC snubber circuit 930 on the secondary side of the first transformer T1 across the output rectifier D14 and without the energy-harvesting circuit 1200 demonstrated a power conversion efficiency of 87%. However, when the energy-harvesting circuit 1200 was used to harvest leakage inductance energy from the primary side and the secondary side of the first transformer T1 and the harvested leakage inductance energy was injected into the main output of the switch mode power supply 900, the power conversion efficiency increased from 87% to 89.3%.

In some embodiments, the RC snubber circuit 930 may be electrically connected to each of the primary side and the secondary side of the first transformer T1 such that the energy-harvesting circuit 1200 is configured to harvest leakage inductance energy from both the primary side and the secondary side of the first transformer T1 that would have otherwise been dissipated as heat from each of the RC snubber circuits 930. In some embodiments, the harvested leakage inductance energy from the primary side and the secondary side of the first transformer T1 may be injected into the main input of the switch mode power supply 900.

Figure 16:
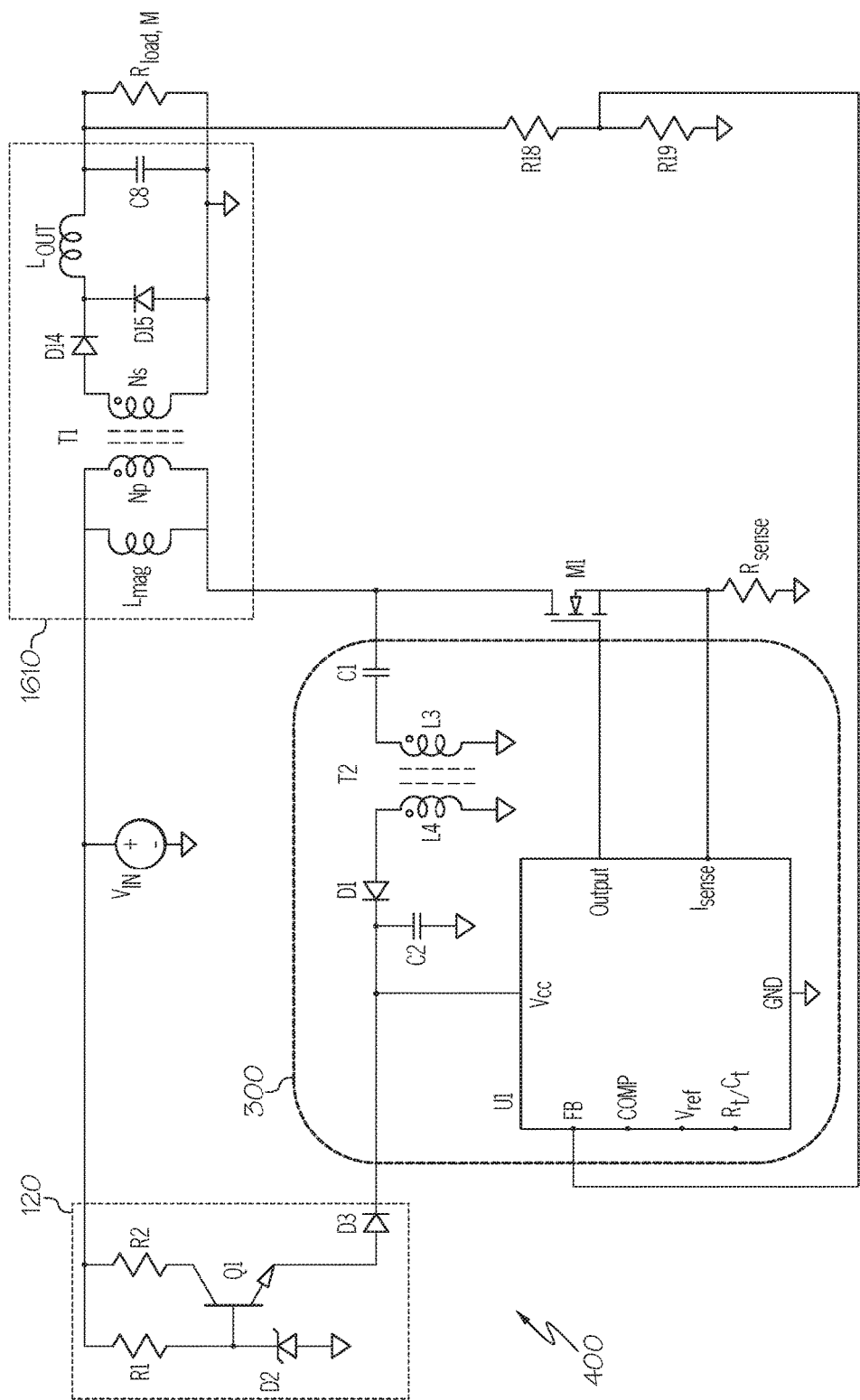
FIG. 16 schematically depicts a sixth example configuration of the energy-harvesting circuit of FIG. 3 placed across the primary power supply switch of a switch mode power supply and configured to power a pulse width modulator (PWM) controller using magnetizing energy harvested from the main transformer of the switch mode power supply, according to one or more embodiments described and illustrated herein.

FIG. 16 schematically depicts a sixth example configuration of the energy-harvesting circuit 300 of FIG. 3 electrically connected to the transistor switch M1 (the primary power supply switch) of a switch mode power supply 400, as described above in detail with respect to FIGS. 4 and 7. The switch mode power supply 400 has a power converter circuit 1610, which is a forward converter circuit based on a transformer having windings of same-polarity, higher magnetizing inductance and no air gap. Forward converter circuits directly transfer the magnetic energy from the primary side to the secondary side of the main transformer as electric current when the primary power supply switch is turned on, without storing the magnetic energy.

The energy-harvesting circuit 300 includes the second transformer T2 having the second primary winding L3 and the second secondary winding L4, which share a magnetic core between them. The coupling capacitor C1 is electrically connected between the transistor switch M1 and the second primary winding L3 and is configured to provide a reset mechanism for the magnetic core in the second transformer T2 every switching cycle. The secondary side of the second transformer T2 has the diode D1. The anode of the diode D1 is electrically connected to the second secondary winding L4. The cathode of the diode D1 is electrically connectable to the ground-referenced load circuitry $R_{load,H}$. An output capacitor C2 is electrically connected in series with the cathode of the diode D1 and in parallel with the load circuitry $R_{load,H}$. The diode D1, the capacitor C2 and the load circuitry $R_{load,H}$ form a magnetically isolated RCD clamp circuit. In the embodiment shown in FIG. 16, the PWM controller U1 replaces the load circuitry $R_{load,H}$.

To avoid magnetic saturation of the forward converter circuit, magnetizing energy of the first transformer T1 is pulled from its magnetic core in order to reset the first transformer T1, when the transistor switch M1 is turned off. The energy-harvesting circuit 300 in FIG. 16 is configured to operate as a magnetically isolated RCD clamp to reset the first transformer T1. The magnetizing energy of the first transformer T1 that would have otherwise dissipated as heat in a passive RCD clamp is passed over the isolation barrier of the second transformer T2 and harvested to generate a power supply rail for supplying power to the load circuitry $R_{load,H}$. As described with respect to FIGS. 3 and 4, if any point between the cathode of the diode D1 and the output capacitor C2 is grounded, then a negative power supply rail is generated. If any point of the load circuitry $R_{load,H}$ opposite to the cathode of the diode D1 is grounded, then a positive supply rail is generated. If a center tap on the second secondary winding L4 of the second transformer T2 is grounded, then bipolar (+/−) power supply rails are generated. The power supply rail(s) generated can be grounded to a primary ground, a secondary ground, a chassis or left floating. Thus in FIG. 16, the energy-harvesting circuit 300 provides a simple and efficient way of harvesting the magnetizing energy of the first transformer T1 to power the PWM controller U1 during steady-state operation, while resetting the magnetic core of the first transformer T1.

Figure 17:
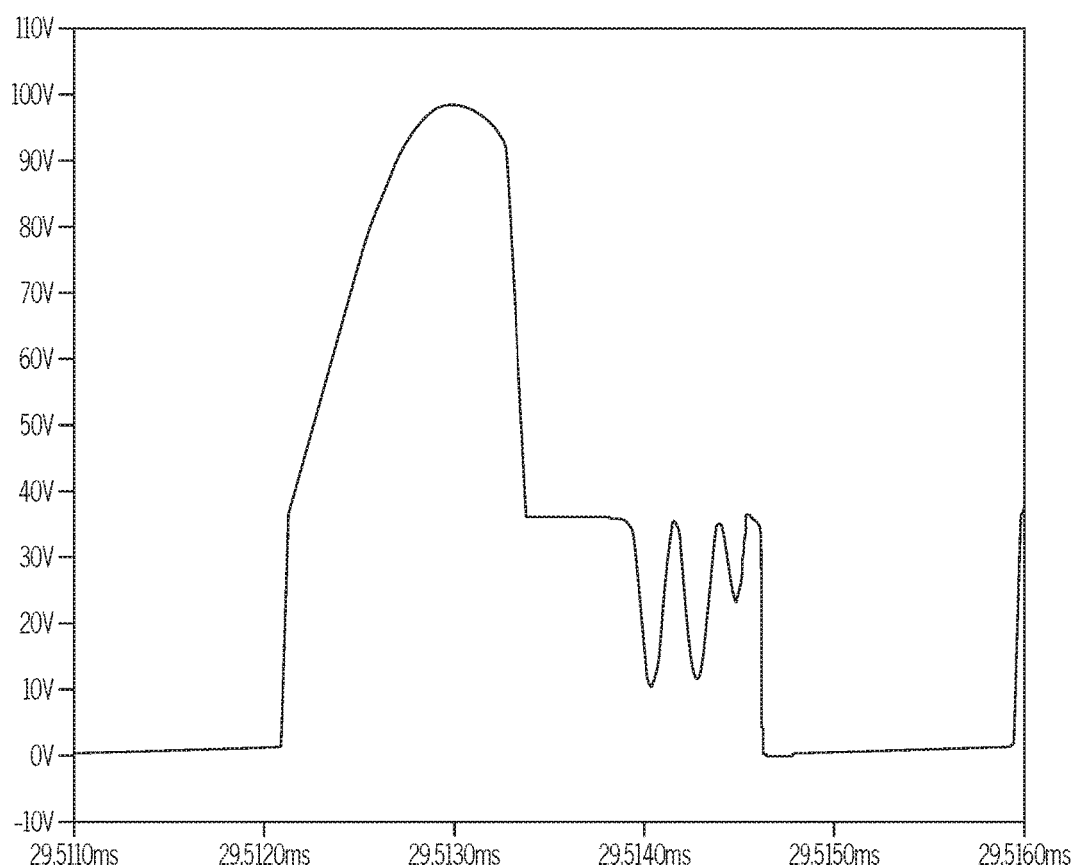
FIG. 17 graphically depicts voltage stress at the primary power supply switch of the switch mode power supply of FIG. 16, according to one or more embodiments described and illustrated herein.
Figure 18:
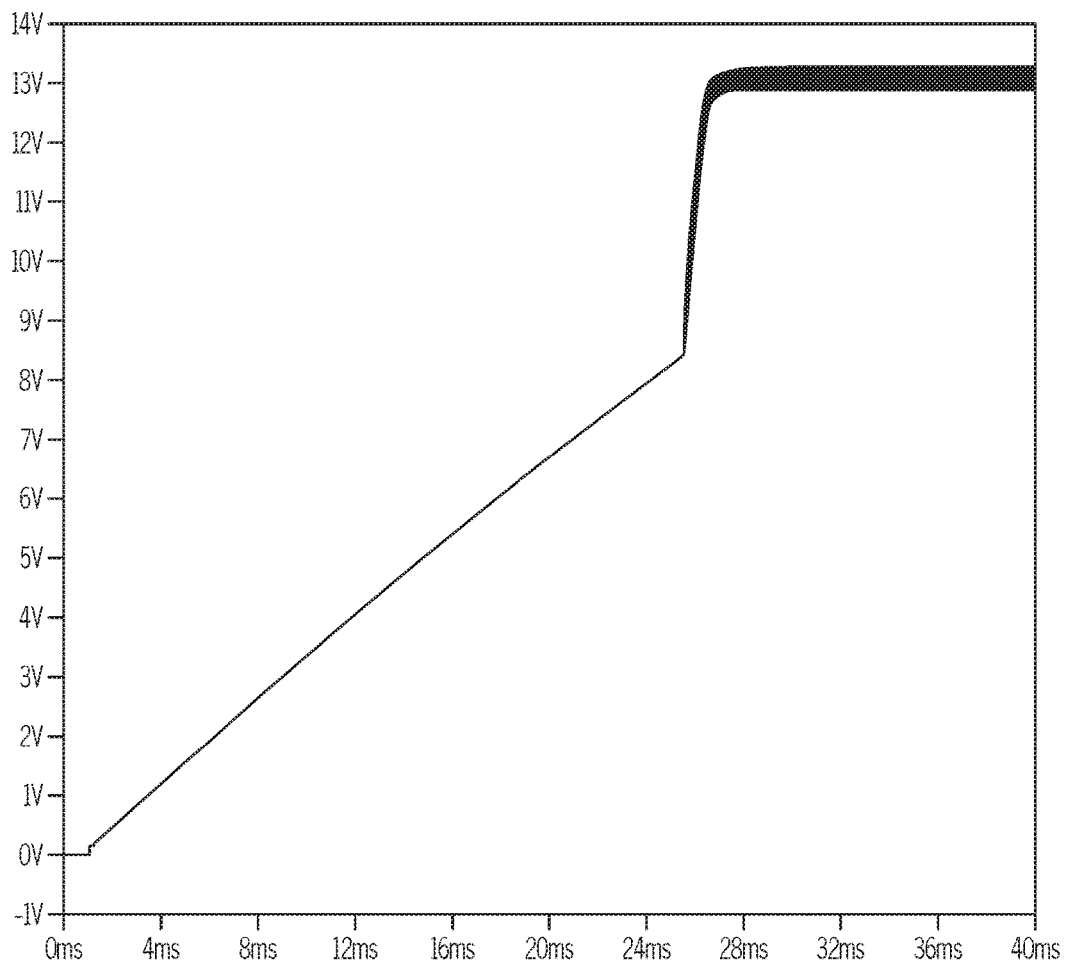
FIG. 18 graphically depicts the output voltage characteristics of the power supply rails generated by the energy-harvesting circuit of the of the primary power supply switch in FIG. 16 during power-up and steady-state operations, according to one or more embodiments described and illustrated herein.

FIG. 17 graphically depicts voltage stress at the transistor switch M1 (the primary power supply switch) of the switch mode power supply 400 of FIG. 16 having the energy-harvesting circuit 300, when the transistor switch M1 turns off. In the example shown in FIG. 17, the voltage stress at the transistor switch M1 due to magnetizing energy of the first transformer T1 is clamped to 98V, well below 150V, the breakdown voltage of the transistor switch M1. Moreover, any fluctuation of the voltage stress, demonstrated by the ringing curve after the voltage spike, is minimized before the voltage stress levels reduce and eventually disappear. FIG. 18 graphically depicts the output voltage characteristics of the power supply rails generated by harvesting the magnetizing energy of the first transformer T1 of FIG. 16 during power-up and steady-state operations of the transistor switch M1. The waveform in FIG. 18 is indistinguishable from the voltage characteristics of a typical PWM controller power supply, as is known in the art.

Embodiments of the disclosure provide techniques for harvesting excess electromagnetic energy that can be applied across a wide variety of circuits other than switch mode power supplies such as, but not limited, to machines, motor drives, industrial equipment, etc. The techniques provide a beneficial reduction in power supply voltage stress, while simultaneously increasing power supply efficiency. Embodiments of the disclosure offer significant advantages compared to the current state of the art by presenting solutions that overcome multiple power supply design problems simultaneously—the need to control voltage stress, the need to generate multiple output voltages, the need to minimize power consumption, the need to reduce heat, the need to minimize EMI, and the need to reset the transformer core. For space applications, whereas generating output voltages can cost thousands of dollars per output, the embodiments described herein can provide a low-cost option that costs hundreds of dollars instead.

As used herein, the phrase "electrically coupled" means either directly electrically coupled by electrical conductors or indirectly electrically coupled by way of intermediate electrical components and/or electrical conductors. For the purposes of describing and defining embodiments of the present disclosure, it is noted that the terms "about" and "substantially" are utilized herein to represent the inherent degree of uncertainty that may be attributed to any quantitative comparison, value, measurement, or other representation. The terms "about" and "substantially" are also utilized herein to represent the degree by which a quantitative representation may vary from a stated reference without resulting in a change in the basic function of the subject matter at issue.

The foregoing description of the various embodiments described herein has been presented for the purposes of illustration and description. It is not intended to be exhaustive or to limit the embodiments to the precise steps and/or forms disclosed. Many alternatives, modifications and variations will be apparent to those skilled in the art of the above teaching. Moreover, although multiple inventive aspects have been presented, such aspects need not be utilized in combination, and various combinations of inventive aspects are possible in light of the various embodiments provided above. Accordingly, the above description is intended to embrace all possible alternatives, modifications, combinations, and variations that have been discussed or suggested herein, as well as all others that fall with the principles, spirit and broad scope as defined by the claims.

What is claimed is:

1. An energy-harvesting circuit configured to harvest energy from a power converter circuit within a switch mode power supply and generate a positive, a negative or a bipolar power supply rail to power load circuitry, the energy-harvesting circuit comprising:
   a transformer having a primary winding, a secondary winding and a magnetic core shared therebetween, wherein the primary winding is electrically connected between a drain and a source of a transistor switch connected to the power converter circuit;
   a coupling capacitor electrically connected between the drain and the primary winding and configured to provide a reset mechanism for the magnetic core in the transformer;
   a diode having an anode and a cathode, the anode electrically connected to the secondary winding; and
   a capacitor electrically connected in series with the cathode of the diode and in parallel with the load circuitry, wherein the transformer has a non-resonant reset mechanism and the diode, the capacitor and the load circuitry form a non-resonant passive clamp circuit magnetically isolated by the transformer.

2. The energy-harvesting circuit of claim 1, wherein:
the power converter circuit is a flyback converter circuit;
the energy-harvesting circuit is configured to harvest leakage inductance energy of the power converter circuit dissipated by one or more RC snubber circuits electrically connected to the flyback converter circuit within the switch mode power supply; and
the energy-harvesting circuit powers the load circuitry with the harvested leakage inductance energy.

3. The energy-harvesting circuit of claim 1, wherein:
the power converter circuit is a flyback converter circuit;
the energy-harvesting circuit is configured to harvest leakage inductance energy of the power converter circuit dissipated by one or more RC snubber circuits electrically connected to the flyback converter circuit within the switch mode power supply; and
the energy-harvesting circuit feeds the harvested leakage inductance energy into an input or an output of the switch mode power supply.

4. The energy-harvesting circuit of claim 1, wherein:
the power converter circuit is a forward converter circuit;
the energy-harvesting circuit is configured to harvest magnetizing energy of the power converter circuit within the switch mode power supply; and
the energy-harvesting circuit powers the load circuitry with the harvested magnetizing energy.

5. A switch mode power supply comprising:
a power converter circuit comprising a first transformer having a first primary winding, a first secondary winding and a first magnetic core shared therebetween;
a transistor switch having a drain electrically connected to the first primary winding and a source electrically connected to ground; and
an energy-harvesting circuit configured to harvest energy from the power converter circuit, the energy-harvesting circuit electrically connected to the transistor switch and comprising:
  a second transformer having a second primary winding, a second secondary winding and a second magnetic core shared therebetween, wherein the second primary winding is electrically connected between the drain and the source of the transistor switch;
  a coupling capacitor electrically connected between the drain and the second primary winding and configured to provide a reset mechanism for the second magnetic core in the second transformer;
  a diode having an anode and a cathode, the anode electrically connected to the second secondary winding; and
  a capacitor electrically connected in series with the cathode of the diode and in parallel with load circuitry, wherein the second transformer has a non-resonant reset mechanism and the diode, the capacitor and the load circuitry form a non-resonant passive clamp circuit magnetically isolated by the second transformer.

6. The switch mode power supply of claim 5, wherein the transistor switch is a metal-oxide-semiconductor field-effect transistor (MOSFET).

7. The switch mode power supply of claim 5, wherein the diode is a Zener diode, a Schottky diode or a p-n diode.

8. The switch mode power supply of claim 5, wherein the energy-harvesting circuit is configured to generate a negative power supply rail by electrically connecting any point between the cathode of the diode and the capacitor to ground.

9. The switch mode power supply of claim 5, wherein the energy-harvesting circuit is configured to generate a positive power supply rail by electrically connecting any point of the load circuitry opposite to the cathode of the diode to ground.

10. The switch mode power supply of claim 5, wherein the energy-harvesting circuit is configured to generate a bipolar power supply rail by electrically connecting a center tap on the second transformer to ground.

11. The switch mode power supply of claim 5 further comprising a pulse width modulation (PWM) controller electrically connected to the first primary winding; wherein:
the power converter circuit is a flyback converter circuit;
the energy-harvesting circuit harvests leakage inductance energy of the power converter circuit; and
the PWM controller is the load circuitry powered by the energy-harvesting circuit during steady-state operation.

12. The switch mode power supply of claim 5, wherein:
the power converter circuit is a flyback converter circuit;
the energy-harvesting circuit is configured to harvest leakage inductance energy of the power converter circuit dissipated by a resistor-capacitor (RC) snubber circuit electrically connected to the first primary winding of the power converter circuit; and
the energy-harvesting circuit powers the load circuitry with the harvested leakage inductance energy.

13. The switch mode power supply of claim 5, wherein:
the power converter circuit is a flyback converter circuit;
the energy-harvesting circuit is configured to harvest leakage inductance energy of the power converter circuit dissipated by an RC snubber circuit electrically connected to the first secondary winding of the power converter circuit; and
the energy-harvesting circuit powers the load circuitry with the harvested leakage inductance energy.

14. The switch mode power supply of claim 5, wherein:
the power converter circuit is a flyback converter circuit;
the energy-harvesting circuit is configured to harvest leakage inductance energy of the power converter circuit dissipated by a first RC snubber circuit electrically connected to the first primary winding of the power converter circuit and a second RC snubber circuit electrically connected to the first secondary winding of the power converter circuit; and
the energy-harvesting circuit powers the load circuitry with the harvested leakage inductance energy.

15. The switch mode power supply of claim 5, wherein:
the power converter circuit is a flyback converter circuit;
the energy-harvesting circuit is configured to harvest leakage inductance energy of the power converter circuit dissipated by an RC snubber circuit electrically connected to the first primary winding of the power converter circuit; and
the energy-harvesting circuit feeds the harvested leakage inductance energy into an input or an output of the switch mode power supply.

16. The switch mode power supply of claim 5, wherein:
the power converter circuit is a flyback converter circuit;
the energy-harvesting circuit is configured to harvest leakage inductance energy of the power converter circuit dissipated by an RC snubber circuit electrically connected to the first secondary winding of the power converter circuit; and
the energy-harvesting circuit feeds the harvested leakage inductance energy into an input or an output of the switch mode power supply.

17. The switch mode power supply of claim 5, wherein:
the power converter circuit is a flyback converter circuit;
the energy-harvesting circuit is configured to harvest leakage inductance energy of the power converter circuit dissipated by a first RC snubber circuit electrically connected to the first primary winding of the power converter circuit and a second RC snubber circuit electrically connected to the first secondary winding of the power converter circuit; and
the energy-harvesting circuit feeds the harvested leakage inductance energy into an input or an output of the switch mode power supply.

18. The switch mode power supply of claim 5 further comprising a pulse width modulation (PWM) controller electrically connected to the first primary winding;
wherein:
the power converter circuit is a forward converter circuit;
the energy-harvesting circuit is configured to harvest magnetizing energy of the first transformer of the power converter circuit thereby resetting the first magnetic core; and
the PWM controller is the load circuitry powered by the energy-harvesting circuit during steady-state operation.

19. The switch mode power supply of claim 5, wherein:
the power converter circuit is a forward converter circuit;
the energy-harvesting circuit is configured to harvest magnetizing energy of the first transformer of the power converter circuit thereby resetting the first magnetic core; and
the energy-harvesting circuit powers the load circuitry with the harvested magnetizing energy.

20. An energy-harvesting circuit configured to harvest energy from a power converter circuit within a switch mode power supply, the energy-harvesting circuit comprising:
means for transferring excess electromagnetic energy from a transistor switch electrically connected to the power converter circuit to a magnetically isolated clamp circuit;
means for storing the excess electromagnetic energy in the magnetically isolated clamp circuit; and
means for powering a load circuitry by referencing the stored excess electromagnetic energy to a ground, wherein the magnetically isolated clamp circuit is a non-resonant passive clamp circuit.

\* \* \* \* \*